US012790508B2

(12) United States Patent
Abdulhamid et al.

(10) Patent No.: US 12,790,508 B2
(45) Date of Patent: Nov. 10, 2026

(54) WATER-SOLUBLE CHITOSAN SALT AS CORROSION INHIBITOR AGAINST STEEL IN CORROSIVE MEDIUM

(71) Applicant: KING FAHD UNIVERSITY OF PETROLEUM AND MINERALS, Dhahran (SA)

(72) Inventors: Mahmoud Atef Abdulhamid, Dhahran (SA); Arumugam Madhan Kumar, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 389 days.

(21) Appl. No.: 18/628,165

(22) Filed: Apr. 5, 2024

(65) Prior Publication Data

US 2025/0206975 A1 Jun. 26, 2025

Related U.S. Application Data

(60) Provisional application No. 63/614,755, filed on Dec. 26, 2023.

(51) Int. Cl.

| | |
|---|---|
| ***C09D 105/08*** | (2006.01) |
| ***C09D 5/08*** | (2006.01) |
| ***C09D 5/16*** | (2006.01) |

(52) U.S. Cl.

CPC ............ *C09D 105/08* (2013.01); *C09D 5/08* (2013.01); *C09D 5/1637* (2013.01)

(58) Field of Classification Search

CPC ...... C09D 105/08; C09D 5/08; C09D 5/1637; C09D 5/16; C09D 5/082; C09D 5/086

See application file for complete search history.

(56) References Cited

U.S. PATENT DOCUMENTS

2015/0184304 A1* 7/2015 Kumar .................... C09D 7/65 252/500

FOREIGN PATENT DOCUMENTS

| | | |
|---|---|---|
| CN | 101532138 A | 9/2009 |
| CN | 101988202 A | 3/2011 |

(Continued)

OTHER PUBLICATIONS

Wu Maotao et al ; Corrosion inhibition performance of chitosan and phosphonic chitosan for mild steel in seawater ; Journal of Chinese Society for Corrosion and Protection, vol. 30, Issue 3 ; Jun. 13, 2010, ; 5 Pages.

(Continued)

*Primary Examiner* — Marites A Guino-O Uzzle

(74) *Attorney, Agent, or Firm* — Oblon, McClelland, Maier & Neustadt, L.L.P.

(57) ABSTRACT

A method of inhibiting corrosion of a metal surface, including contacting the metal surface with a chitosan salt in the presence of a corrosive medium. On contacting the metal surface, at least a portion of the chitosan salt adsorbs to the metal surface. At least one unit in the chitosan salt has the following formula (I), (I)

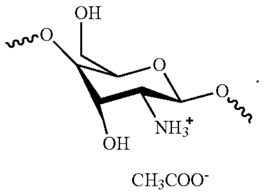

The ∿∿ indicates bonding to additional units of the chitosan salt. The chitosan salt has a higher solubility in water (Continued)

than a same chitosan that is not in a salt form. The metal surface in the corrosive medium has a corrosion inhibition efficiency at least 80% higher than a same metal surface in the corrosive medium that is not contacted with the chitosan salt.

18 Claims, 23 Drawing Sheets

(56) References Cited

FOREIGN PATENT DOCUMENTS

| | | |
|---|---|---|
| CN | 103113490 A | 5/2013 |
| CN | 103113491 A | 5/2013 |

OTHER PUBLICATIONS

Feng et al. ; Synergistic protective effect of carboxymethyl chitosan and cathodic protection of X70 pipeline steel in seawater ; The Royal Society of Chemistry. 7 ; Nov. 18, 2016 ; 9 Pages.

Yang Xiaogang et al ; Corrosion inhibition properties of water soluble chitosan and its degradation products for mild steel in seawater ; Journal of Chinese Society for Corrosion and Protection, vol. 28, Issue 6 ; Oct. 10, 2009 ; 6 Pages.

* cited by examiner

Optimized structure

HOMO Orbital

LUMO Orbital

WATER-SOLUBLE CHITOSAN SALT AS CORROSION INHIBITOR AGAINST STEEL IN CORROSIVE MEDIUM

CROSS REFERENCE TO RELATED APPLICATION

The present application claims benefit of priority to U.S. Provisional Application No. 63/614,755 having a filing date of Dec. 26, 2023 which is incorporated herein by reference in its entirety.

STATEMENT OF PRIOR DISCLOSURE BY INVENTOR

Aspects of the present disclosure are described in A. M. Kumar, T. Rajesh, I. B. Obot, I. I. Bin Sharfan, and M. A. Abdulhamid "Water-soluble chitosan salt as ecofriendly corrosion inhibitor for N80 pipeline steel in artificial sea water: Experimental and theoretical approach"; International Journal of Biological Macromolecules; 2023; 254; 1; 127697, incorporated herein by reference in its entirety.

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to a corrosion inhibitor, particularly to a water-soluble chitosan salt as a corrosion inhibitor for corrosion inhibition of steel in a corrosive medium.

Description of Related Art

The "background" description provided herein presents the context of the disclosure generally. The work of the presently named inventors, to the extent it is described in this background section, as well as aspects of the description that may not otherwise qualify as prior art at the time of filing, are neither expressly nor impliedly admitted as prior art against the present invention.

Corrosion of metallic materials affects the structure and performance of materials, causing vast economic loss in many industrial sectors. At present, using corrosion inhibitors is often the easiest, cheapest, and most effective corrosion mitigation approach, enabling the use of less expensive metallic materials in aggressive environments. In general, the molecular structure of effective corrosion inhibitors frequently contains donor heteroatoms and π-bonds, including oxygen, sulfur, nitrogen, and aromatic moieties, which are primarily accredited to the capability in terms of electron-donating and electron-withdrawing features. Cost-effective corrosion inhibitors commonly contain destructive elements, including phosphorus, sulfur, or aromatic complex ring structures, that are detrimental to the environment. Thus, eco-friendly, and biodegradable corrosion inhibitors with effective inhibition efficiency have attracted attention.

Several studies have used polymers of polysaccharide derivatives as green corrosion inhibitors owing to their active sites, which can effectively interact with metallic ions in a solution. Among the biodegradable polysaccharides, chitosan is an appropriate polysaccharide as a natural inhibitor of different metallic materials in an aggressive environment. Chitosan contains polysaccharides, hydroxyl groups, and amino amide groups and exhibits an effective ion chelating capacity that can inhibit scale formation. However, a primary concern with chitosan is its limited solubility in aqueous media, which restricts its utilization as a corrosion inhibitor. Beneficially, the second carbon of the chitosan skeleton possesses active side-chain amino groups, while the sixth carbon has hydroxyl groups. The mentioned active groups can be chemically altered to enhance the solubility. Several chemical structures have been utilized to alter chitosan to produce corrosion inhibitors, such as modified β-cyclodextrin, polyaspartic acid, isonicotinaldehyde, N-benzyl chitosan oligosaccharide quaternary ammonium salts, and 4-amino-5-methyl-1,2,4-triazole-3-thiol. These chemical alterations improved the corrosion inhibition rate of chitosan however, the chemical modification requires additional steps and expense to produce.

Accordingly, there is a need to develop a water-soluble and eco-friendly chitosan-based corrosion inhibitor for protecting metal surfaces in the marine environment by overcoming the limitations of the art. It is one object of the present disclosure to provide a water-soluble chitosan with limited chemical modification, which has enhanced corrosion inhibition efficiency at low concentrations.

SUMMARY

In an exemplary embodiment, a method of inhibiting corrosion of a metal surface is described. The method includes contacting the metal surface with a chitosan salt in the presence of a corrosive medium. The corrosive medium is saltwater. On contacting the metal surface, at least a portion of the chitosan salt adsorbs to the metal surface. At least one unit in the chitosan salt has the following formula (I),

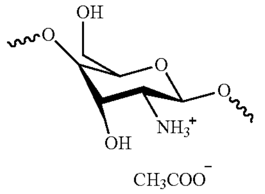

(I)

The indicates bonding to additional units of the chitosan salt. The chitosan salt has a higher solubility in water than the same chitosan that is not in a salt form. The metal surface in the corrosive medium has a corrosion inhibition efficiency at least 80% higher than the same metal surface in the corrosive medium that is not contacted with the chitosan salt.

In some embodiments, at least 50% of the units in the chitosan salt are deacetylated.

In some embodiments, 75-85% of the units in the chitosan salt are deacetylated.

In some embodiments, at least 10% of the units in the chitosan salt have the formula (I).

In some embodiments, the chitosan salt has a molecular weight of 190,000-310,000 Daltons (Da).

In some embodiments, the chitosan salt further comprises units having the following formulas (II) and (III), (II)

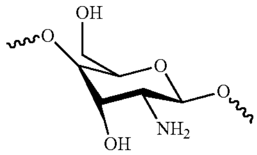

(III)

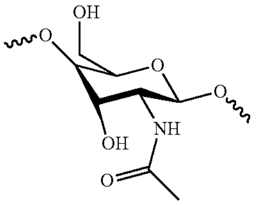

In some embodiments, the chitosan salt does not comprise units having a formula other than formula (I), formula (II), and formula (III).

In some embodiments, the chitosan salt does not comprise a phosphate group, a carboxyl group, or a Schiff base group, chemically bonded to a unit of the chitosan salt.

In some embodiments, the chitosan salt has a substantially same morphology and stability as the chitosan that is not in the salt form.

In some embodiments, the chitosan salt is both amorphous and crystalline.

In some embodiments, the saltwater comprises 1,000-100,000 parts per million (ppm) (weight by volume (w/v)) of a salt.

In some embodiments, the saltwater has a temperature of 20-80° C.

In some embodiments, the metal surface is made of at least one metal selected from the group consisting of carbon steel, a carbon steel alloy, and a mild steel.

In some embodiments, the metal surface is part of a casing, a pipe, a pump, a screen, a valve, or a fitting of an oil or gas well.

In some embodiments, the chitosan salt has a concentration of 1-1,000 ppm (w/v) in the corrosive medium.

In some embodiments, when the chitosan salt is present at a concentration of 1,000 ppm (w/v) in the corrosive medium, the surface in the corrosive medium has a corrosion inhibition efficiency 96% higher than the same metal surface that is not contacted with the chitosan salt.

In some embodiments, the metal surface has a corrosion rate of less than 0.5 millimeter per year (mmpy) in the corrosive medium.

In some embodiments, when the chitosan salt is present at a concentration of 250-1,000 ppm (w/v) in the corrosive medium, the metal surface has a corrosion rate of less than 0.05 mmpy in the corrosive medium.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof may be readily obtained as the same becomes better understood by reference to the following detailed description when considered in connection with the accompanying drawings, wherein.

DETAILED DESCRIPTION

Figure 1:
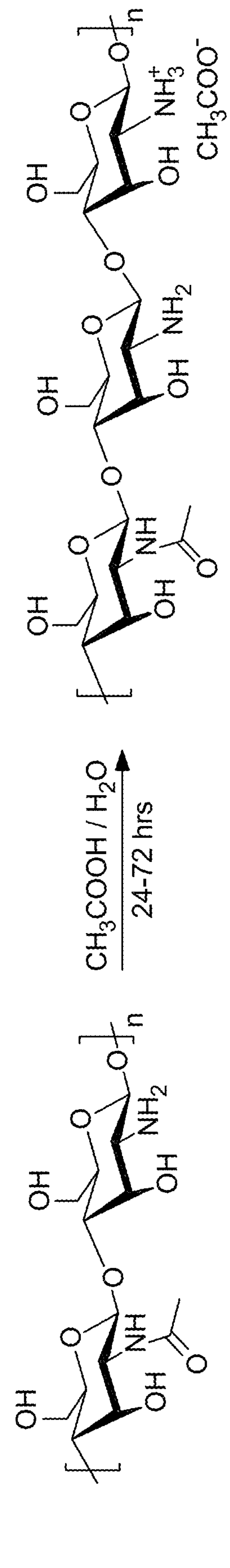
FIG. 1 is a synthetic route for preparation of a chitosan salt (CS), according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "a" and "an" and the like carry the meaning of "one or more".

Within the description of this disclosure, where a numerical limit or range is stated, the endpoints are included unless stated otherwise. Also, all values and subranges within a numerical limit or range are specifically included as if explicitly written out.

As used herein, "corrosion" refers to the process that converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides, is a well-known example of electrochemical corrosion producing oxide(s) and/or salt(s) of the original metal. Corrosion degrades the useful properties of materials and structures, including strength, appearance, and permeability to liquids and gases. Many structural alloys corrode merely from exposure to moisture in the air, but the process can be strongly affected by exposure to certain substances. Because corrosion is a diffusion-controlled process, it generally occurs on exposed surfaces.

Aspects of the present disclosure are directed to a water-soluble chitosan salt as a corrosion inhibitor for steel in a corrosive medium.

Chitosan is a linear polysaccharide composed of randomly distributed units of β-(1→4)-linked D-glucosamine (deacetylated unit, (Formula (II)) and N-acetyl-D-glucosamine (acetylated unit, Formula (III)). Chitosan is commonly obtained by treating the chitin shells of shrimp and other crustaceans with an alkaline substance, such as sodium hydroxide. In chitin, all units are acetylated and during the treatment process a portion of the units are deacetylated to form chitosan.

(II)

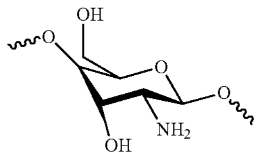

(III)

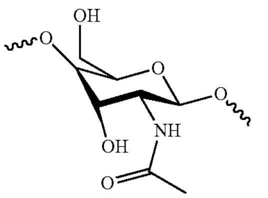

Chitosan, as such, is insoluble or poorly soluble in water, resulting in limited applicability. In an embodiment of the present disclosure, the chitosan is then treated to form a chitosan salt. The chitosan salt of the present disclosure has a higher solubility in water than the same chitosan that is not in a salt form. The chitosan salt includes at least a portion of the following units of Formula (I) where ∿ indicates bonding to additional units of the chitosan salt. By including charged species in the structure of the chitosan, the chitosan salt has improved water solubility compared to chitosan itself. In some embodiments, at least 10%, preferably 20%, 30%, 40%, 50%, 60%, 70%, 80%, 90%, or 100% of the units in the chitosan salt have the formula (I).

(I)

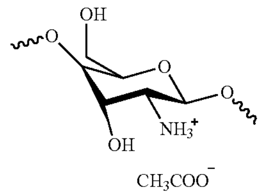

In some embodiments, the chitosan salt includes many repeating units of compounds of Formula (I), Formula (II), and Formula (III). In a preferred embodiment, the chitosan salt does not include any units having a formula other than Formula (I), Formula (II), and Formula (III). In some embodiments, the unit of Formula (I) is bonded to the unit of Formula (II). In some embodiments, the unit of Formula (I) is bonded to the unit of Formula (III). In some embodiments, the unit of Formula (I) is bonded to the unit of Formula (II) and the unit of Formula (III).

The amount of the units having Formula (I), Formula (II) and Formula (III) depend on the deacetylation percentage of the original chitosan starting material. In a preferred embodiment, in the chitosan salt of the present disclosure at least 50%, preferably 55%, 60%, 65%, 70%, 75%, 80%, 85%, 90%, 95%, or 100% of the units in the chitosan salt are deacetylated. In other words, there are a limited number of units of the Formula (III).

In some embodiments, the chitosan salt has a molecular weight of 190,000-310,000 Daltons (Da). In one embodiment, the chitosan salt has a weight average molecular weight of 190-310 kDa, preferably 200-300 kDa, preferably 210-290 kDa, preferably 220-280 kDa. The molecular weight is based on a sum of the units of Formulas (I), (II), and (III) in the overall chitosan polymer. In some embodiments, the chitosan salt is both amorphous and crystalline.

In a preferred embodiment, the chitosan salt substantially has the same morphology and stability as the chitosan that is not in the salt form. In some embodiments, the chitosan salt has a substantially similar, ±10%, 5%, or 1%, decomposition temperature as chitosan. In some embodiments, the chitosan salt displays the same peaks in Fourier transform infrared (FTIR) and X-ray diffraction (XRD) as that of chitosan.

In some embodiments, the chitosan salt is produced by mixing chitosan in acetic acid, preferably the chitosan is fully dissolved in the acetic acid to form a mixture. In a preferred embodiment, the mixture is stirred for 24-96 hours, preferably 48 hours, or 72 hours to fully dissolve the chitosan. In some embodiments, the chitosan salt is then precipitated out of the mixture by pouring into the mixture an excess amount of an incompatible solvent, such as but not limited to acetone and methanol. The precipitated chitosan salt is then separated by any method known in the art, such as but not limited to filtration, and dried at a temperature of 80-150° C., preferably 90-140° C., 100-130° C., or 110-120° C.

In a preferred embodiment, the production of the chitosan salt does not include any additional steps or functionalization with additional solubilizing groups, for the purpose of large-scale applicability and environmental concerns. In some embodiments, the chitosan salt does not comprise a phosphate group, a carboxyl group, or a Schiff base group, chemically bonded to a unit of the chitosan salt.

The method of the present disclosure involves inhibiting the corrosion of a metal surface by mixing or introducing the chitosan salt into an aqueous corrosive medium in contact with the metal surface. The chitosan salt is introduced into the corrosive medium at a concentration of 1-1,000 ppm (w/v), preferably 100-1,000 ppm (w/v), preferably 200 ppm (w/v), preferably 250 ppm (w/v), preferably 300 ppm (w/v), preferably 500 ppm (w/v), preferably 600 ppm (w/v), preferably 700 ppm (w/v), preferably 800 ppm (w/v), preferably 900 ppm (w/v), and most preferably 1,000 ppm (w/v) into the corrosive medium. In a most preferred embodiment, the chitosan salt has a concentration of 1,000 ppm (w/v) in the corrosive medium.

The corrosive medium is an aqueous medium. The aqueous medium may be acidic or alkaline. In some embodiments, the corrosive medium includes one or more acids selected from hydrochloric acid (HCl), sulfuric acid ($H_2SO_4$), nitric acid ($HNO_3$), phosphoric acid ($H_3PO_4$), acetic acid, hydrofluoric acid (HF), and/or combinations of. In some embodiments, the corrosive medium is alkaline and has a pH in the range of 7-12, preferably 7-9. In a preferred embodiment, the corrosive medium is saltwater or seawater. The saltwater comprises 1,000-100,000, preferably 10,000-90,000, 20,000-80,000, 30,0000-70,000, or 40,000-60,0000 parts per million (ppm) (weight by volume (w/v)) of salt. The salt is an inorganic salt consisting of one or more of sodium chloride, magnesium chloride, magnesium sulphate, potassium chloride, calcium carbonate, and magnesium bromide. Inorganic salts such as sodium chloride have been known to cause serious corrosion to steels. As used herein, brine is an aqueous mixture of one or more soluble salts (e.g. sodium chloride, potassium chloride, calcium chloride, calcium bromide, sodium bromide, potassium bromide, zinc bromide, magnesium chloride). In some embodiments, brine may be present in the corrosive medium. For example, the corrosive medium may contain 1-10 wt. %, 2-5 wt. %, or about 3.5 wt. % sodium chloride, 0.1-1 wt. %, 0.2-0.5 wt. %, or about 0.3 wt. % calcium chloride, as well as 0.05-1 wt. %, 0.1-0.4 wt. %, or about 0.2 wt. % magnesium chloride, each relative to a total weight of the corrosive medium. In some embodiments, the saltwater has a temperature of 20-80° C., preferably 25° C., 30° C., 35° C., 40° C., 45° C., 50° C., 55° C., 60° C., 65° C., 70° C., 75° C., or 80° C.

When the metal surface comes in contact with the chitosan in the corrosive medium, at least a portion of the chitosan salt, preferably 10%, preferably 20%, preferably 30%, preferably 40%, preferably 50%, preferably 60%, preferably 70%, preferably 80%, preferably 90%, or preferably 100% is adsorbed to the metal surface. The chitosan salt forms a protective film on the metal surface.

The metal surface may include one or more selected from copper, copper alloys (e.g. brass or bronze), aluminum, aluminum alloys (e.g. aluminum-magnesium, nickel-aluminum, aluminum-silicon), nickel, nickel alloys (e.g. nickel-titanium or nickel-chromium), iron, iron alloys, carbon steels, alloy steels, duplex stainless steels, and tool steels. In a preferred embodiment, the metal surface includes steel. Steel is an alloy of iron and carbon that is widely used in construction and other applications because of its high tensile strength and low cost. Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized into three groups depending on their carbon content: low carbon steels/mild steels contain up to 0.3% carbon, medium carbon steels contain 0.3-0.6% carbon, and high carbon steels contain more than 0.6% carbon. Alloy steels contain alloying elements (e.g., manganese, silicon, nickel, titanium, copper, chromium, and aluminum) in varying proportions in order to manipulate the steel's properties, such as its hardenability, corrosion resistance, strength, formability, weldability, or ductility. Stainless steels generally contain between 10-20% chromium as the main alloying element and are valued for high corrosion resistance. With over 11% chromium, stainless steel is about 200 times more resistant to corrosion than mild steel. These steels can be divided into three groups based on their crystalline structure: austenitic steels, ferritic steels, and martensitic steels. Tool steels contain tungsten, molybdenum, cobalt, and vanadium in varying quantities to increase heat resistance and durability, making them ideal for cutting and drilling equipment.

In one embodiment, the metal surface comprises steel, carbon steel, low carbon steel, mild steel, medium carbon steel, high carbon steel, alloy steel, stainless steel, austenitic steel, ferritic steel, martensitic steel, tool steel, or mixtures thereof. Preferably, the metal surface includes carbon steel, more specifically, medium carbon steel with carbon content in the range of 0.3-0.6, preferably 0.4-0.5%. In a preferred embodiment, the metal surface is N80-grade steel.

The metal surface may be a part of a casing—for example, a well casing, a pipe—for example, transport pipelines, a pump, a screen, a valve, a fitting of an oil or gas well, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems. In preferred embodiments, the metal surface may be used in the drilling, petroleum, oil, and gas industries, including drills, drill bits, pumps, compressors, pipelines, and other tools and equipment, electric parts such as transformers, power generators, and electric motors, vehicle parts including those of boats, autos, trucks, aircraft, and military vehicles. Tools, including construction, automotive, household, and kitchen tools, are included.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time), and density. Corrosion rate is typically computed using millimeter penetration per year (mmpy) or mils per year (mpy). Mils penetration per year (mmpy) is a unit of measurement equal to approximately one-thousandth of an inch. In metric expression 1 mil is equal to 0.0254 mm, accordingly, 1 mpy is equal to 0.0254 mmpy.

In one or more embodiments, the method of the present disclosure in any of its embodiments imparts a corrosion rate of less than 0.5 millimeter penetration per year (mmpy) to the metal surface in the corrosive medium, preferably less than 0.4 mmpy, preferably less than 0.3 mmpy, preferably less than 0.2 mmpy, preferably less than 0.1 mmpy, preferably less than 0.08 mmpy, preferably less than 0.05 mmpy; the corrosion rate dependent on the concentration of the chitosan salt in the corrosive medium. In some embodiments, when the chitosan salt has a concentration of 250-1,000 ppm (w/v) in the corrosive medium, the metal surface has a corrosion rate of less than 0.05 mmpy in the corrosive medium, preferably 0.04, 0.03, 0.02, or 0.01 mmpy.

Corrosion inhibition efficiencies may be measured with the Tafel extrapolation, linear polarization resistance (LPR), potentiodynamic polarization (PDP), gravimetric, or other similar methods. In a preferred embodiment, the corrosion inhibition efficiency of the metal in the corrosive medium containing the chitosan salt is at least 80%, preferably 82%, preferably 84%, preferably 85%, preferably 88%, preferably 90%, preferably 92%, preferably 95%, preferably 96% higher than the corrosion rate of a substantially identical metal surface exposed to a substantially identical aqueous corrosive medium lacking the chitosan salt.

While not wishing to be bound to a single theory, it is thought that the improved water solubility of the chitosan salt allows for the formation of an inhibitive and stable film of the chitosan salt on the surface of the metal. The chitosan salt has a number of $NH_2$ and OH groups in its repeating units, which are highly polar and results in higher ion chelation.

EXAMPLES

The following examples demonstrate a method of inhibiting corrosion of a metal surface using a chitosan-based corrosion inhibitor. The examples are provided solely for illustration and are not to be construed as limitations of the present disclosure, as many variations thereof are possible without departing from the spirit and scope of the present disclosure.

Example 1. Materials

Chitosan with a medium molecular weight (190,000-310,000 Da) and acetic acid (99%) were procured from Sigma-Aldrich (Taufkirchen, Germany) and used without any further purification. Deionized water was produced by Millipore (Milli-Q Academic) water purification system.

Example 2: Preparation of Chitosan Salt

Chitosan salt was prepared by dissolving 1 gram (g) of chitosan in 99.31 milliliters (mL) of water and 0.693 mL of acetic acid to form a mixture. The mixture was magnetically stirred at room temperature for 48-72 h to ensure total solubility (FIG. 1). Then the chitosan salt was precipitated by adding acetone to the chitosan solution to obtain the product, which was collected and dried at 100° C. for further characterization. The chitosan salt is referred to throughout as CS. The pristine chitosan is defined herein as the chitosan procured from Sigma-Aldrich without any further modification.

Example 3: Polymer Characterization

Fourier transform infrared (FTIR) analysis for the CS and pristine chitosan was carried out via Bruker INVENIO Series FTIR spectrometer in the range of 400-4000 inverse centimeter ($cm^{-1}$) to identify and confirm the surface functional groups in the prepared samples. Thermal characteristics of the polymers were analyzed through thermogravimetric analysis (TGA)/DTG techniques in a TA instruments Q600 SDT apparatus. The temperature gradually increased from 30° C. to 800° C. with a heating rate of 10° C. per minute ($min^{-1}$) under a continuous flow rate of 20 milliliters per minute (ml/min) of nitrogen. X-ray diffraction (XRD) was carried out using the Pananalytical diffractometer model Empyrean Alpha1 at 20 kilovolts (kV) and 40 milliamperes (mA), with Cu Kα (λ=1.54 angstrom (Å)) radiation source. The diffraction intensity was measured in the range of angles between 4° and 70° with 2θ in the range of 4°-70° with a step size of 0.014 second inverse ($s^{-1}$).

Example 4: Electrochemical Corrosion Studies

Gamry Reference 3000 model electrochemical instrument was used to conduct all the electrochemical experiments, and the obtained data was analyzed using the inbuilt software Echem analyst. A typical three-electrode flat electrochemical cell was used, in which an N80 steel sample as a working electrode was placed on the side with an exposure area of 1 centimeter square ($cm^2$). A platinum mesh and a saturated calomel electrode (SCE) were employed as auxiliary and reference electrodes, respectively. Before running each series of electrochemical tests, open circuit potential (OCP) was monitored for about 30 minutes to ensure the electrochemical steady state of the investigated systems. Linear polarization resistance (LPR) tests were performed at a sweeping scan rate of 1 millivolts per second (mV $s^{-1}$) by superimposing±25 mV vs open circuit potential (OCP). Potentiodynamic polarization (PDP) tests were performed under the potential range±250 mV vs OCP at a scan rate of 1 mV $s^{-1}$. Electrochemical corrosion parameters such as corrosion potential ($E_{corr}$) and corrosion current density ($i_{corr}$) were estimated from the PDP curves using the Tafel extrapolation. Scanning electrochemical microscopic (SECM) experimentations were carried out using the M370 electrochemical instrument with four electrodes. The SECM microprobe of Pt ultra-micro electrode (diameter of 25 micrometers (μm)) was utilized by getting the applied potential of −0.70 V to detect the dissolved oxygen (DO) in the saline medium. Graphite rod was the counter electrode, whereas Ag/AgCl was the reference electrode. All the electrochemical tests were performed in triplicate for reproducibility. The saline medium is a 3.5% NaCl solution.

Example 5: Estimation of Corrosion Inhibition Performance by Gravimetric Analysis Corrosion inhibition characteristics of CS were initially evaluated through gravimetric experiments. Cleaned steel samples were immersed in the artificial seawater for about 24 h with and without CS inhibitor. Then, the samples were taken out, washed with distilled water, and dried out, and their weights were precisely measured. The average weight loss values were noted and utilized to estimate the corrosion rate (CR in mm $y^{-1}$):

$$C_R = \frac{87w}{AtD} \quad (1)$$

where the symbols w, A, t, and d, represented the average weight loss (mg), the area of specimen ($cm^{-2}$), exposure time (h), and the density of metallic samples, respectively. The surface coverage (θ) and inhibition efficiency (IE %) were assessed from the $C_R$ based on the below relationship:

$$IE\,(\%) = \frac{C_R - C_{R(i)}}{C_R} \times 100 \quad (2)$$

$$\theta = \frac{C_R - C_{R(i)}}{C_R} \quad (3)$$

where, $C_R$ and $C_{R(i)}$ are the corrosion rates in the absence and the presence of inhibitors.

Example 6: Surface Characterization after Exposure to Saline Medium

Scanning electron microscopy (SEM) investigation was performed on the N80 steel substrates after exposing them to the saline medium in the absence and presence of chitosan salt (CS) inhibitors (500 and 1,000 ppm). Energy dispersive X-ray (EDS) analysis was carried out to assess the surface elemental composition of the N80 samples after exposure to the saline medium. The surface topographic information on the N80 surface after exposure was also monitored using the optical profilometric analysis. Attenuated Total Reflectance-Infrared (ATR-IR) spectroscopic analysis was performed on the N80 surface after exposing it to a saline medium in the absence and presence of a CS inhibitor.

Example 7: Theoretical Simulation Studies

The theoretical calculation was carried out using the density functional theory (DFT) with the Becke exchange functional and the Lee-Yang Parr correlation functional (BLYP), together with the generalized gradient approximation (GGA) using double numeric polarization (DNP) basis sets. The effect of solvent (water) was obtained using the COSMO (conductor-like screening model) setting in the software program. Geometry optimization of CS was done to obtain the highest occupied molecular orbital (HOMO) and the lowest unoccupied molecular orbital (LUMO). The convergence criteria and the global orbital cutoffs were set to "fine" before the calculations to ensure accuracy. The tolerances of energy, gradient, and displacement convergence were $1\times10^{-5}$ Ha, $2\times10^{-5}$ Ha. Å$^{-1}$ and $5\times10^{-3}$ Å, respectively. Direct inversion in an iterative subspace (DIIS) and an orbital occupancy smearing parameter of 0.005 Ha were used to speed up the convergence. Dmol3 module in the BIOVIA Materials Studio 2019 program was used for the DFT calculation.

The adsorption energy of the CS onto the Fe surface was obtained using the Monte Carlo simulation. The simulation was conducted in the presence of 50 explicit water molecules to simulate the effect of solvent. The calculation was performed using the Condensed-phase Optimized Molecular Potentials for Atomistic Simulation Studies (COMPASS) force field. The CS molecule was initially geometry optimized with the Forcite module in the BIOVIA Materials Studio 2019 program. The adsorption of the CS was simulated on the Fe (110) crystal plane. The process involved cleaving from bcc Fe crystal, followed by enlargement to a (10×10) supercell and, thereafter, building of a 30 Å thick vacuum slab on the Fe (110). The adsorption energy for the most stable CS—Fe (110) configuration was obtained as output after the simulation. For the Monte Carlo simulation, the adsorption locator module in the BIOVIA Materials studio program was used.

Example 8: Characterization Results

Figure 2A:
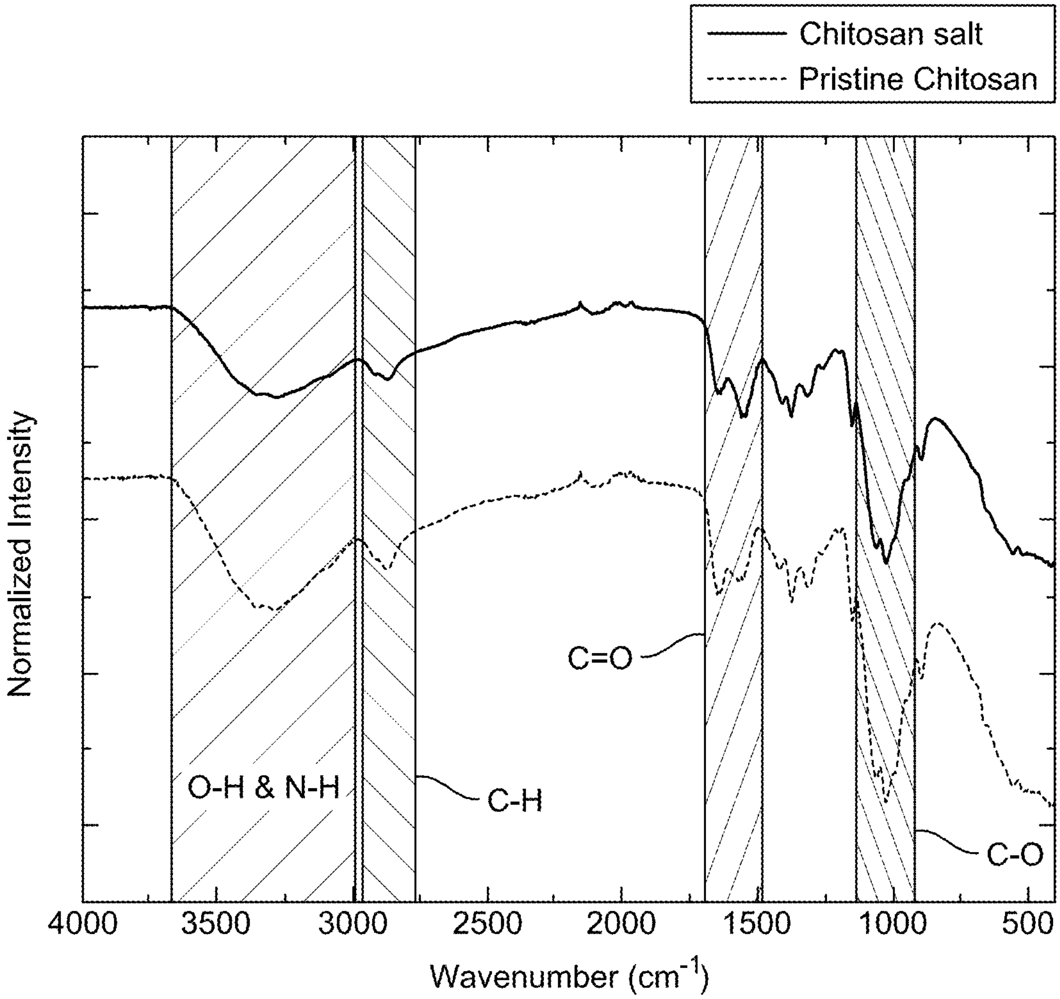
FIG. 2A depicts Fourier-transform infrared (FTIR) spectra of the CS and non-modified or pristine chitosan, according to certain embodiments.

Pristine chitosan and CS were characterized by FTIR to identify the existing functional groups and presented in FIG. 2A. The broad and strong peak at 3358 $cm^{-1}$ represents the O—H and N—H stretching vibration. The adsorption bands at 2850-2950 $cm^{-1}$ were ascribed to $-CH_2$; their intensity was proportional to the acyl chain length. The absorption peaks at 1645 $cm^{-1}$ and 1565 $cm^{-1}$ can be assigned to C═O of the amide groups. In addition, the peaks at 1380 $cm^{-1}$ and 1420 $cm^{-1}$ correspond to the $-CH_3$ symmetrical deformation and the $-CH_2$ bending vibration attributed to the frequencies of the residual organic materials. The absorption peak at 1150 $cm^{-1}$ reveals the presence of anti-symmetric stretching vibration of C—O—C and C—O stretching at 1070 $cm^{-1}$. Both polymers displayed similar FTIR, indicating no alteration to the general chemical structure of the salt.

Figure 2B:
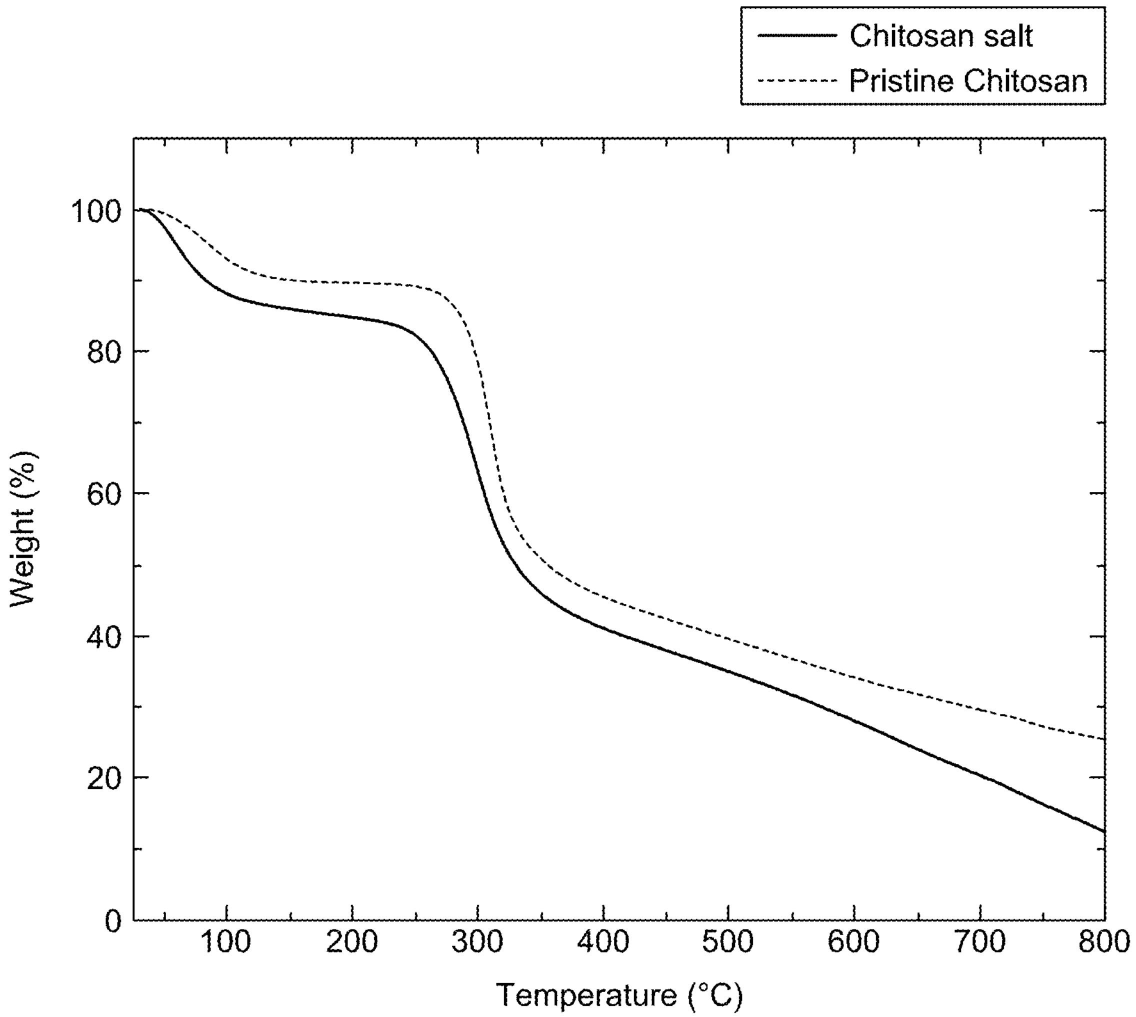
FIG. 2B depicts a thermogravimetric analysis (TGA) curve of the CS and pristine chitosan, according to certain embodiments.

Furthermore, to investigate the thermal stability of the obtained salt, thermogravimetric analysis (TGA) of pristine chitosan and chitosan salt was conducted and presented in FIG. 2B. The CS displayed slightly lower stability relative to the pristine chitosan. Both polymers undergo two major thermal degradation steps, which refer to the decomposition of various functional groups at different temperatures. For instance, the first thermal degradation of the pristine chitosan occurred at 120° C., with a mass loss of 10.36% attributed to the water adsorbed and weakly hydrogen bounded to chitosan. While the second thermal loss reached a maximum mass loss of 37.92% at 343° C. It was caused by the thermal degradation of the pyranose ring on chitosan, which resulted in the rupture of the glycosidic linkages between N-acetylglucosamine rings and glucosamine and the release of volatile compounds. Similarly, two distinct decomposition temperatures were observed for chitosan salt.

Figure 2C:
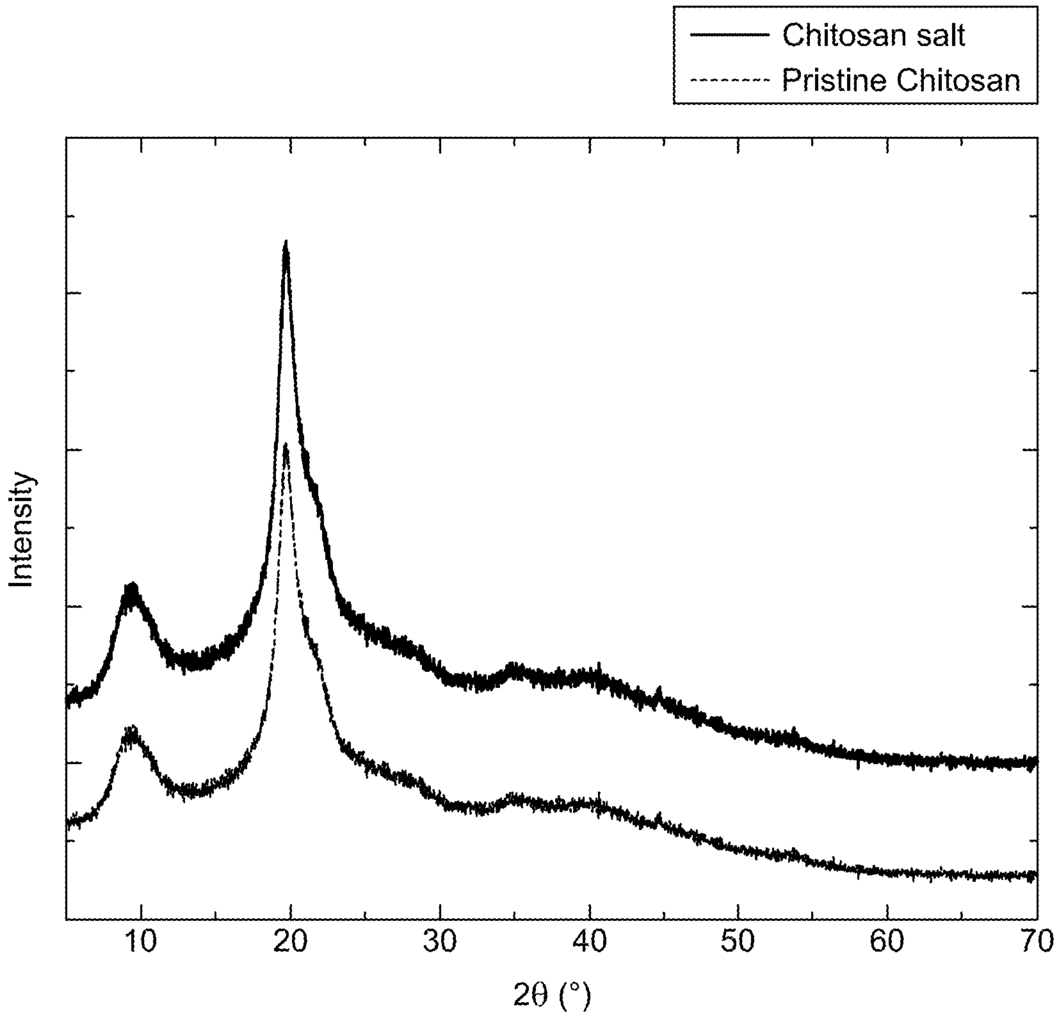
FIG. 2C depicts an X-ray diffraction (XRD) pattern of the CS and pristine chitosan, according to certain embodiments.

Both polymers displayed amorphous structure and were detected by X-ray diffraction (XRD). As shown in FIG. 2C, the XRD pattern of pristine chitosan and chitosan salt were similar and exhibited two peaks at 2θ diffraction angles, approximately at 10° and 20°, indicating the presence of both amorphous and crystalline fragments in the materials, respectively. The reason for this is that chitosan has a number of $NH_2$ and OH groups in its repeating units, which are highly polar and enable the formation of many inter- and intra-molecular hydrogen bonds. The obtained results show that converting chitosan to chitosan salt has had no impact on its stability, morphology, or structure but it only improved its solubility in water.

Example 8: Corrosion Inhibition Results

Figure 3A:
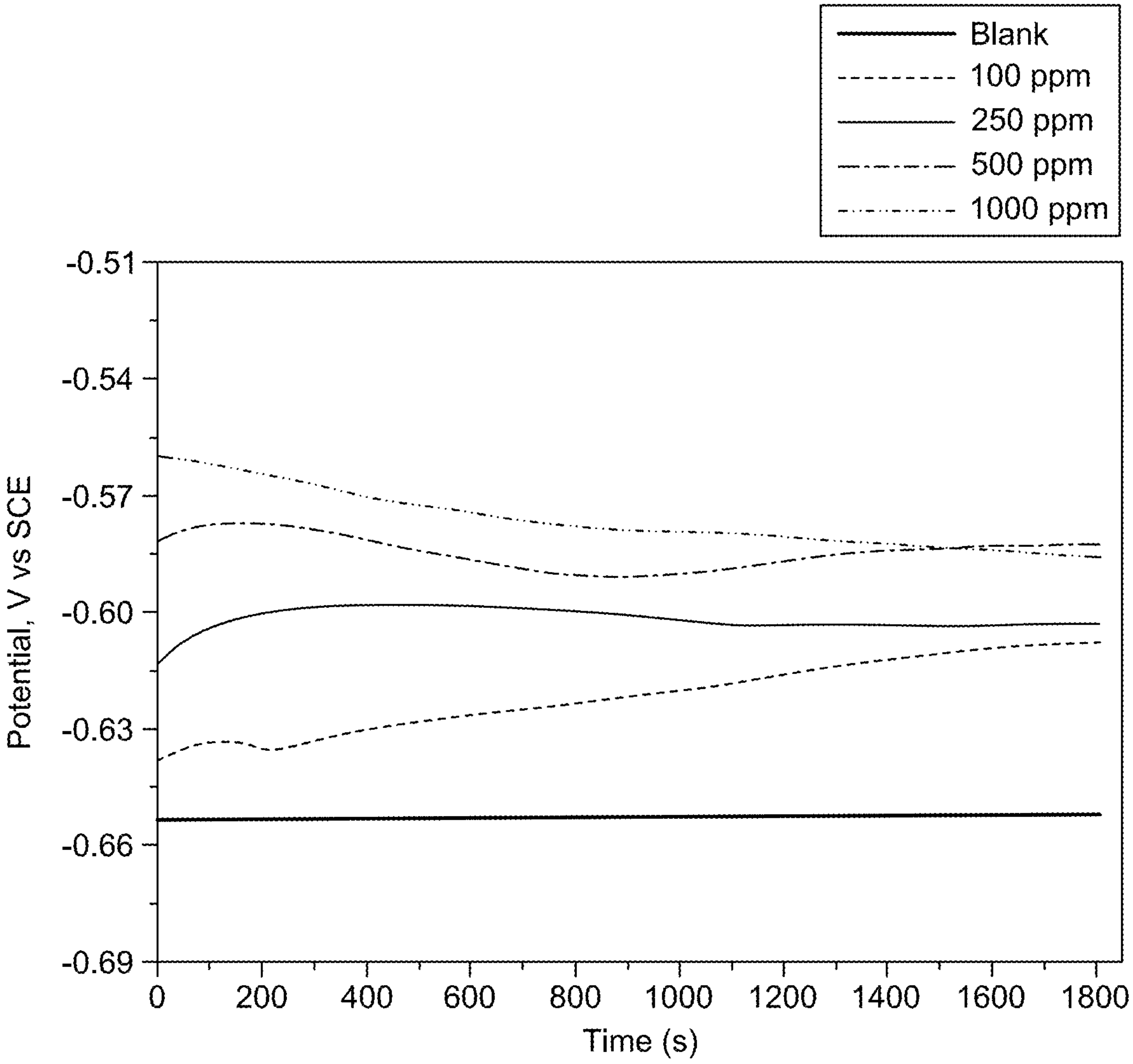
FIG. 3A depicts open circuit potential (OCP) curves of N80 steel substrates with and without the addition of the CS in different concentrations, according to certain embodiments.

FIG. 3A presents the recorded OCP curves of the N80 steel exposed in saline without and with adding CS inhibitor in various concentrations. OCP values generally demonstrate the propensity of the metallic surface to participate in an electrochemical reaction with the corrosive medium, where a lower OCP value represents a higher probability of corrosion. By inspecting OCP curves, it's obvious that the addition of varying concentrations of the CS inhibitor to the saline medium shifted the OCP curves in a positive direction without altering the general characteristic feature of the curves. This observation indicated that the adsorption of thin CS film on the N80 substrate alters the electrochemical steady state of the steel/electrolytic interface.

Figure 3B:
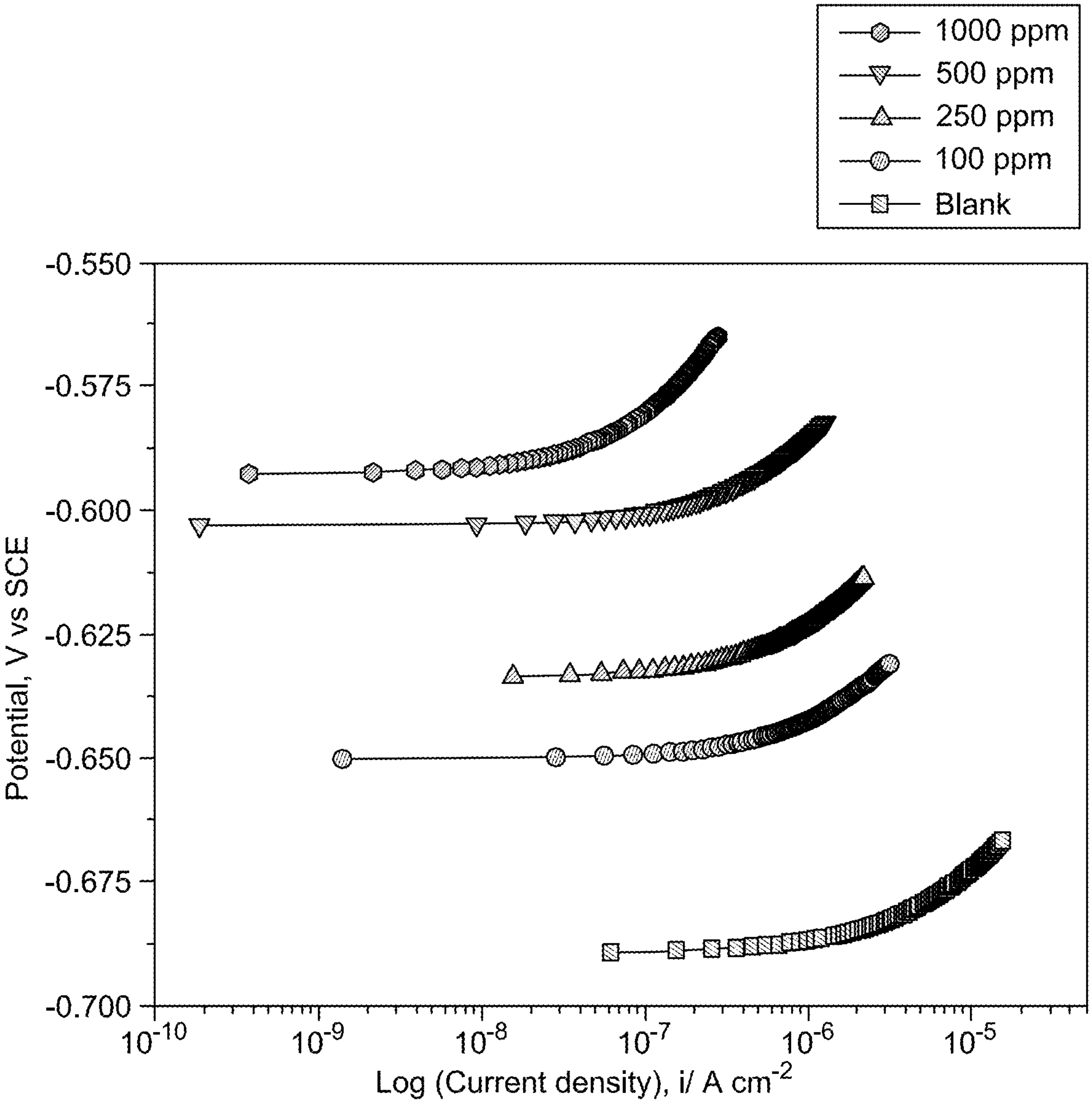
FIG. 3B depicts linear polarization resistance (LPR) curves of the N80 steel substrates with and without the addition of the CS in different concentrations, according to certain embodiments.

The obtained LPR curves without and with the CS inhibitor were monitored for N80 steel in the saline medium, as presented in FIG. 3B. The impact of the added CS inhibitor is illustrated on the obtained LPR curves as it progressively shifts perpendicularly to zero current as the concentration of CS inhibitor increases. The slope of the LPR curves associated with the polarization resistance (Rp) is often utilized to evaluate the inhibition efficiency of LPR tests. By inspecting the obtained LPR results (Table 1), the CS delays the corrosion of N80 steel, due to the interaction between the CS molecules and the surface of N80 steel where the inhibitive and stable film is formed.

TABLE 1

LPR parameters of N80 steel in saline without and without the addition of CS

| S. No. | Substrate | $E_{corr}$ V | $I_{corr}$ μA cm$^2$ | $\beta_a$ mV/dec | $\beta_b$ mV/dec | $R_p$ kΩ cm$^2$ |
|---|---|---|---|---|---|---|
| 1 | Blank | −0.681 | 8.523 | 89 | 91 | 2.291 |
| 2 | 100 ppm | −0.644 | 0.658 | 69 | 78 | 24.1587 |
| 3 | 250 ppm | −0.629 | 0.254 | 97 | 73 | 71.2034 |
| 4 | 500 ppm | −0.597 | 0.128 | 88 | 75 | 137.35 |
| 5 | 1000 ppm | −0.585 | 0.085 | 93 | 80 | 219.53 |

Figure 4:
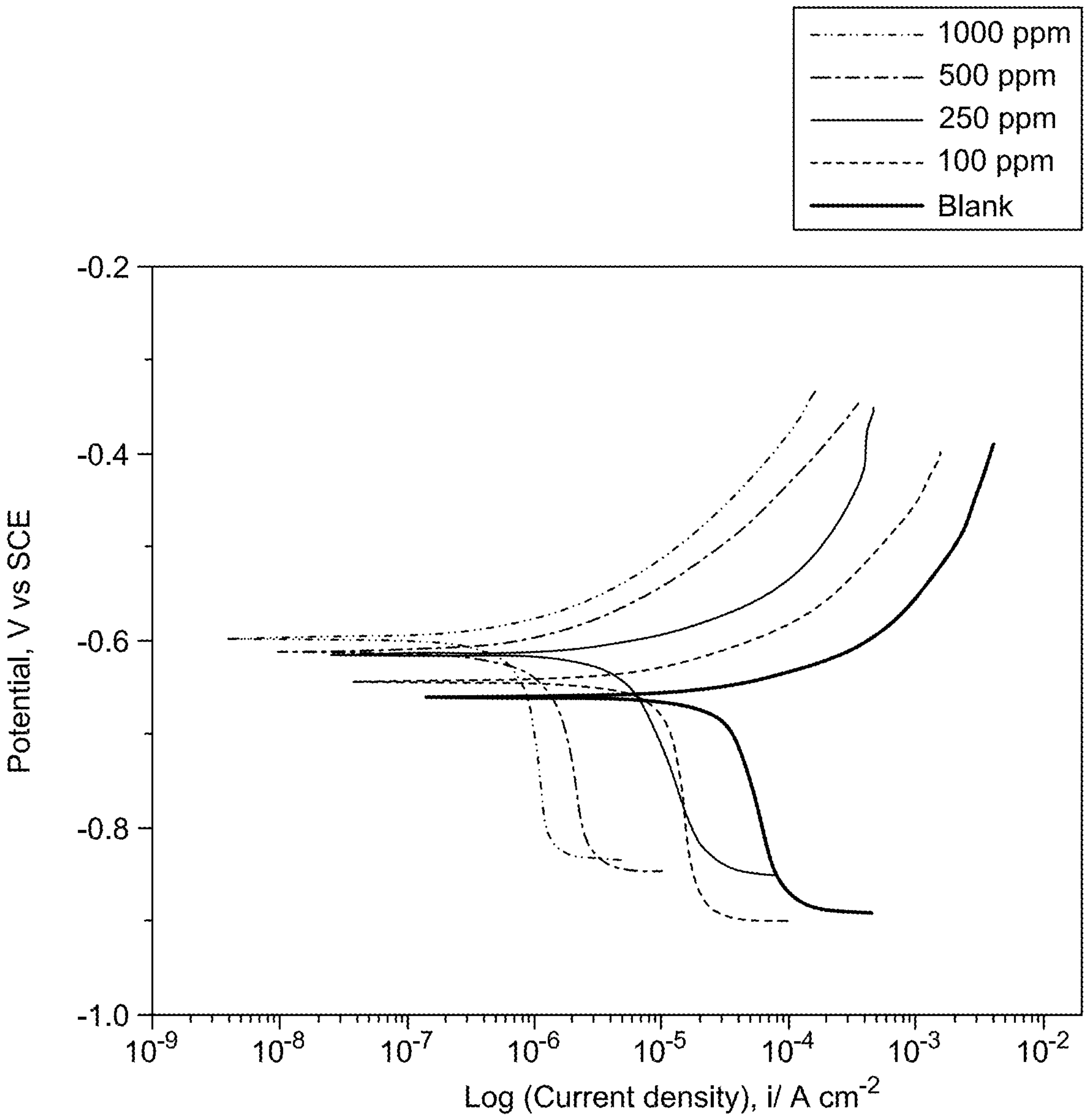
FIG. 4 depicts potentiodynamic polarization (PDP) curves of the N80 steel substrates with and without the addition of the CS in different concentrations, according to certain embodiments.

FIG. 4 presents the PDP curves of N80 steel substrates in a saline medium without and with the insertion of CS in various concentrations. Prime electrochemical values extracted from the PDP curves are listed in Table 2. Closer observation of all the PDP curves indicated the 'mixed-type' inhibition behavior where Tafel slopes (βc and βa) increased with the presence of inhibitor in the medium. In addition, the corrosion potentials ($E_{corr}$) of all PDP curves showed only a minor variation movement toward a negative direction in comparison with the blank saline medium, and the difference in $E_{corr}$ is less than 85 mV (vs SCE), validated as mixed-type inhibitory actions predominantly with anodic inhibitive nature. Inspection of the values summarized in Table 2 show that the corrosion current density ($i_{corr}$) shifted towards a lower value with increasing CS concentration, indicating the formation of an adsorbed inhibitor film on the N80 surface.

TABLE 2

Polarization parameters of N80 steel in saline without and without the addition of CS

| S. No. | Substrate | $E_{corr}$ V | $I_{corr}$ μA cm$^2$ | $\beta_a$ mV/dec | $\beta_b$ mV/dec | η % |
|---|---|---|---|---|---|---|
| 1 | Blank | −0.673 | 65.679 | 99 | 68 | — |
| 2 | 100 ppm | −0.649 | 11.235 | 81 | 72 | 82.89 |
| 3 | 250 ppm | −0.622 | 5.982 | 69 | 82 | 90.89 |
| 4 | 500 ppm | −0.612 | 3.684 | 73 | 94 | 94.39 |
| 5 | 1000 ppm | −0.605 | 2.175 | 88 | 75 | 96.68 |

Figure 5A:
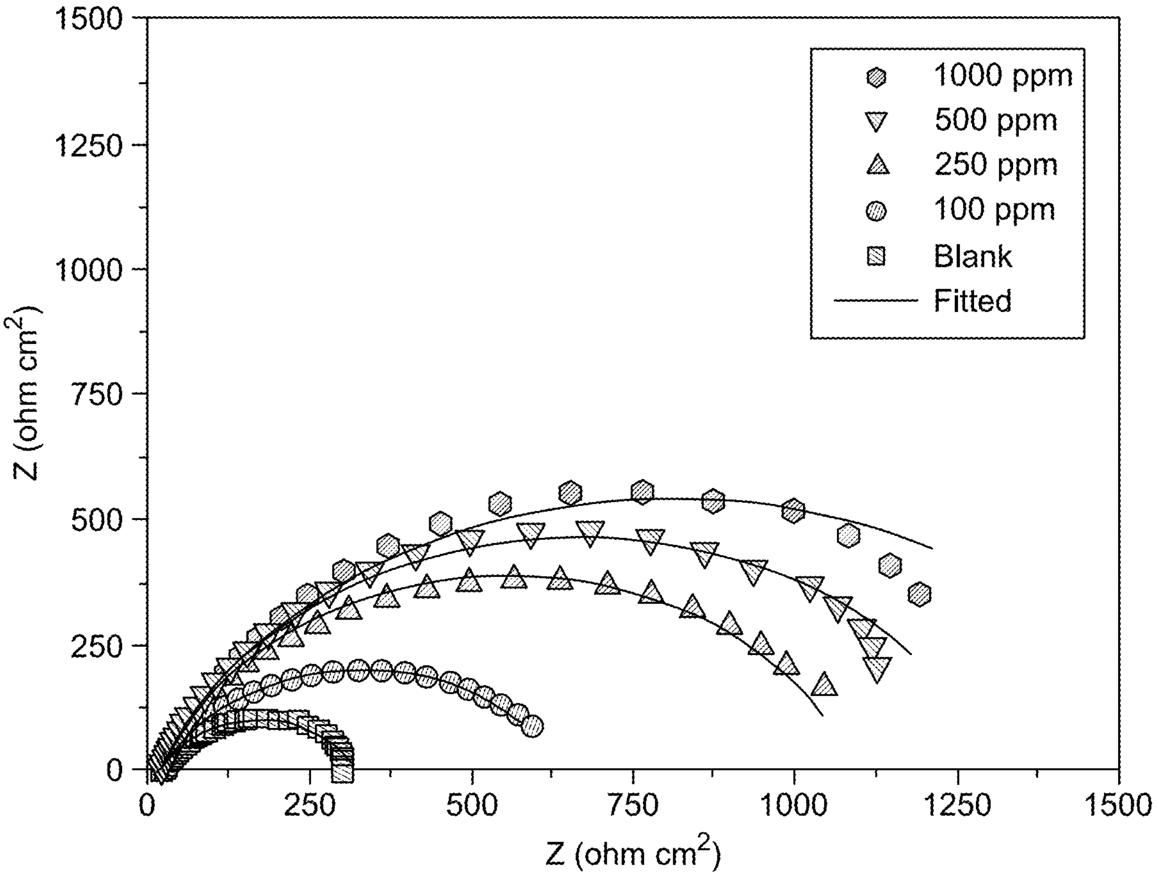
FIG. 5A depicts Nyquist curves of the N80 steel substrates with and without the addition of the CS in different concentrations, according to certain embodiments.
Figure 5B:
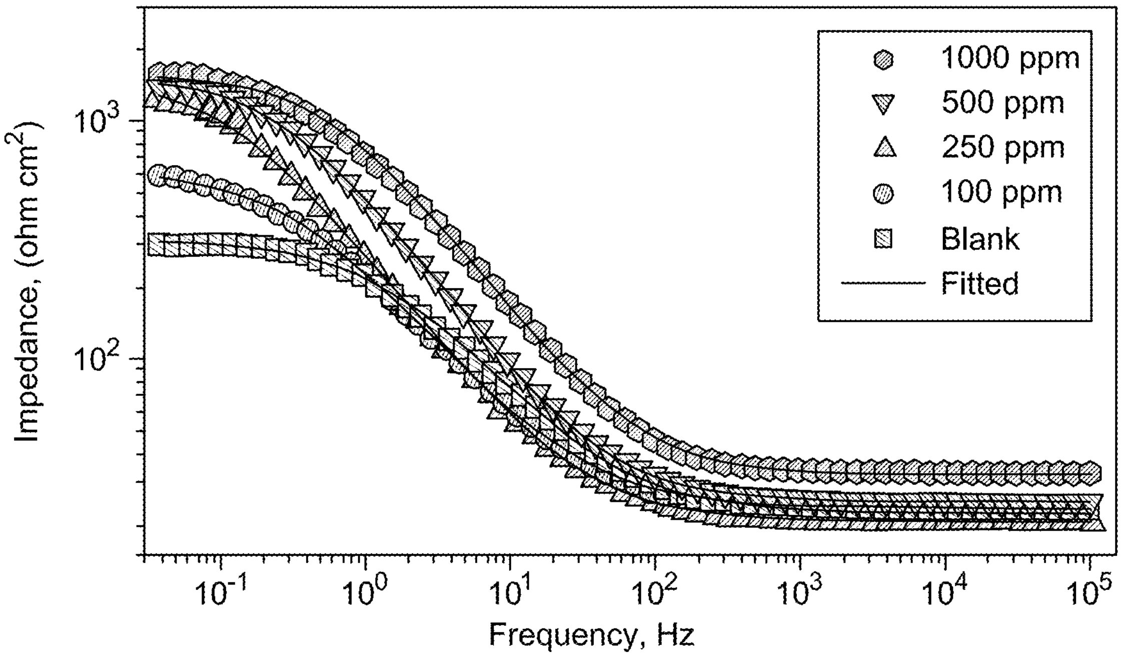
FIG. 5B depicts bode curves of the N80 steel substrates without the addition of CS in different concentrations, according to certain embodiments.
Figure 5C:
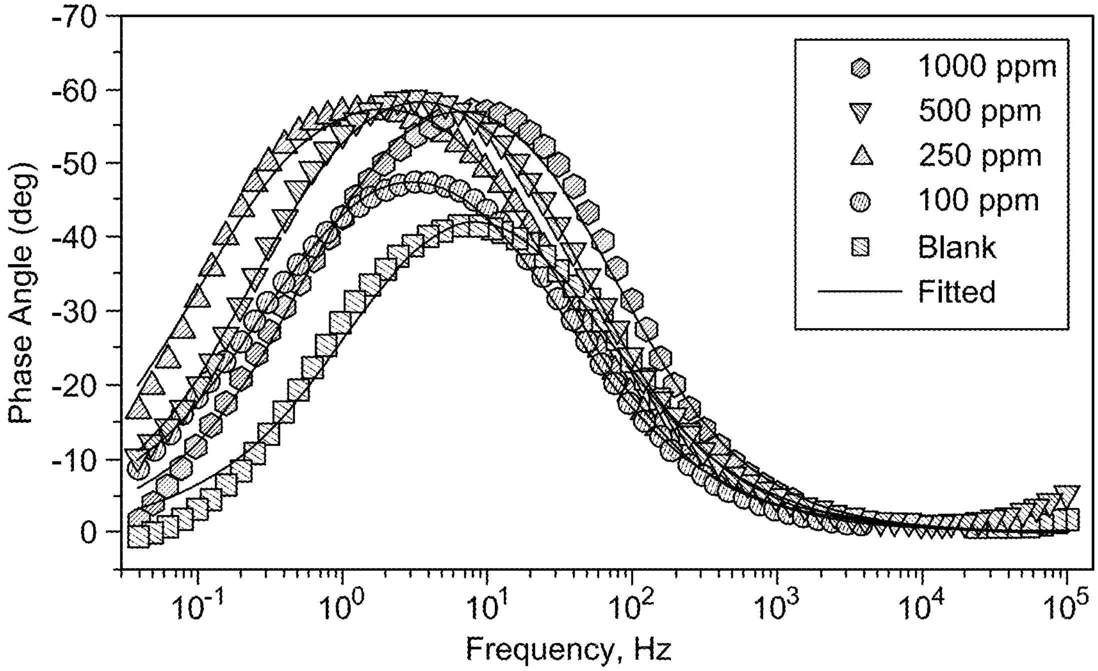
FIG. 5C depicts bode curves of the N80 steel substrates with and without the addition of CS in different concentrations, according to certain embodiments.

Electrochemical dynamics and interface structure formed on metallic substrates were obtained using the EIS experimentations, and the results parameters, impedance, and capacitance were employed in understanding the corrosion phenomenon at the metal/electrolyte interface. The obtained EIS data are presented in FIGS. 5A-5C in Nyquist and Bode formats. All the obtained Nyquist curves (FIG. 5A) present a single capacitive semicircle loop for the entire frequency region, demonstrating that the added inhibitor did not alter the mechanism of corrosion. In general, a larger diameter of Nyquist semicircles indicates effective resistance against charge transfer reaction occurring at the interface of the metal/electrolyte, signifying the lower corrosion rates. Noticeably, the semicircle's diameters increased with the addition of chitosan (FIG. 5A), indicating that the corrosion degree of steel samples in these solutions is reduced.

At different concentrations of CS, the shapes of the Nyquist curves were not different in comparison with the blank saline over the investigated frequency region, signifying that the addition of CS produces a thin adsorption film rather than altering the corrosion mechanism. As observed in FIG. 5A, an increase in the diameter of Nyquist semicircles when the concentrations of CS increased from 100 ppm to 500 ppm. In general, the quality of the formed inhibitor film (compact/discontinuous/porous/intact/fractured) is indicated by capacitance values and corrosion inhibition tendency is reflected by impedance values. Hence, the compacted and effective inhibitive film has high impedance and low capacitance.

TABLE 3

EIS parameters of N80 steel in saline without and without addition of CS

| S. No. | Substrate | $R_s$ Ω cm$^2$ | $R_p$ Ω cm$^2$ | $CPE_{dl}$ $\Omega^{-1} \cdot cm^{-2} \cdot s^n$ | $n_{dl}$ |
|---|---|---|---|---|---|
| 1 | Blank | 25.23 | 311.74 | 458.512 | 0.95 |
| 2 | 100 ppm | 24.28 | 580.27 | 178.23 | 0.97 |
| 3 | 250 ppm | 26.21 | 1228.54 | 110.984 | 0.98 |
| 4 | 500 ppm | 26.88 | 1425.83 | 75.012 | 0.98 |
| 5 | 1000 ppm | 28.21 | 1605.21 | 50.254 | 0.99 |

The Bode plots (FIGS. 5B-5C) demonstrate the electrochemical behavior of the investigated systems with changes in frequency, and evidently display the variation of impedance at low frequency regions which is directly related to the kinetics of the corrosion phenomenon. As displayed in FIGS. 5B-5C, the phase angle peaks in the presence of chitosan inhibitor are higher and broader than those in the blank saline, which become more apparent with increasing inhibitor concentration. Concurrently, the absolute impedance values at low frequency in the presence of CS are found to be higher in comparison with the blank saline in bode resistant plot (FIGS. 5B-5C), validating that the adsorption of thin inhibitor film on sample surface can protect steel substrates. Moreover, the incorporation of CS increased $R_{ct}$ from 311 ohm per square centimeter ($\Omega$ $cm^2$) to 1605 $\Omega cm^2$, which is accompanied with the increasing inhibition efficiency of ~90% for 1,000 ppm of CS, due to the interactions between the free doublets of the heteroatoms present in CS molecules and the vacant d-orbitals of iron.

Figure 5D:
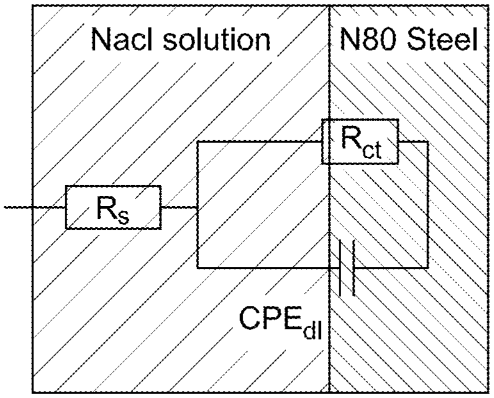
FIG. 5D depicts an equivalent circuit model of the N80 steel substrates in the corrosive environment, according to certain embodiments.

The equivalent circuit model contains two resistances, resistance against solution (Rs) and resistance against charge transfer reactions (Rct), and the on capacitance, double layer capacitance ($C_{dl}$), as portrayed in FIG. 5D was utilized for EIS fitting analysis to attain the EIS parameters, as presented in Table 3. A constant phase element (CPE) was replaced with the capacitive element ($C_{dl}$) to compensate for variations from perfect dielectric features caused by the heterogeneous nature of the metallic surfaces. The impedance of the CPE is given by, $Z_{CPE}=Y_0^{-1}$ $(j\omega)^{-n}$, where $Y_0$ denotes the CPE constant along with its exponent (n), j is an imaginary number, and $\omega$ is the angular frequency in rad $s^{-1}$. The decrease in the values of $CPE_{dl}$ with the increasing concentration of CS revealed that the decrease in local dielectric constant occurred along with the increasing thickness of the electrical double layer due to the adsorption of the inhibitor molecules at the metal/electrolytic interface.

Figure 6A:
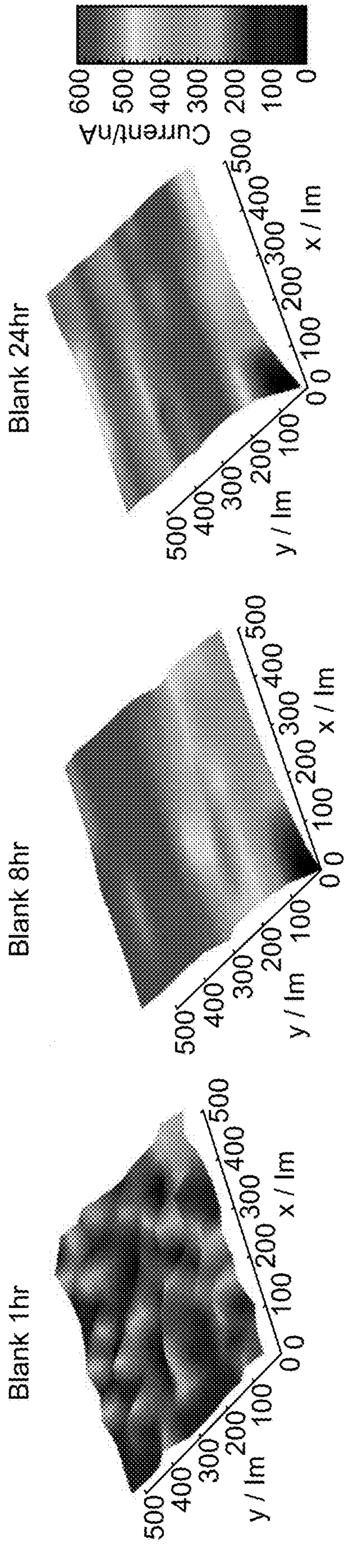
FIG. 6A depicts scanning electrochemical microscopic (SECM) mapping images of a blank N80 steel surface after being exposed to a saline medium at different time points, according to certain embodiments.
Figure 6B:
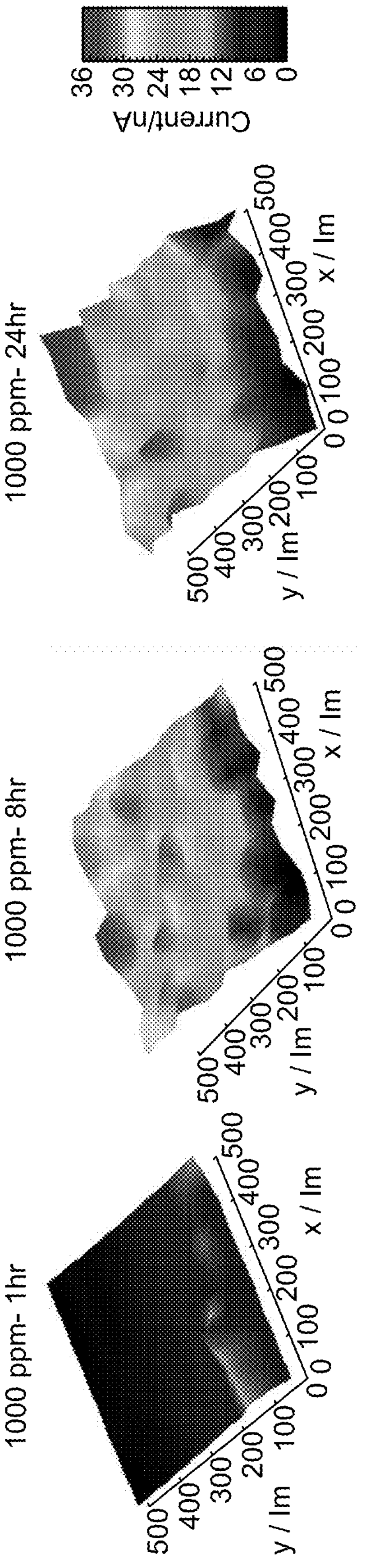
FIG. 6B depicts SECM mapping images of the N80 steel substrate after being exposed to a saline medium in the presence of 1,000 ppm CS at different time points, according to certain embodiments.

Scanning electrochemical microscopy (SECM) results for the N80 steel substrates without and with the CS as a function of the immersion period (1, 8, and 24 hours) are presented in FIGS. 6A-6B. In general, SECM micrographs reveal the electrochemical corrosion activity by exhibiting the variation of current fluctuation with expanding the exposure period due to the varied faradaic currents based on the different extent of corrosion reactions. In the case of blank saline medium (FIG. 6A), N80 steel substrates showed an increase in current due to the initiation of corrosion after one hour of immersion. After 8 hours of exposure, corrosion regions were expanded, and higher current densities were observed above the N80 surface in blank saline solution, revealing that the amount of dissolved oxygen (DO) is decreased pointedly, indicating that the DO is consumed by the severe cathodic reaction. With prolonged exposure, the corrosion zones were rapidly propagated and exhibited a higher tip current, demonstrating that the blank N80 steel surface experienced severe corrosion damage after 24 h exposure to the saline medium.

The degree of the SECM tip current that signified the corrosion severity was noticeably varied with the addition of CS inhibitor. N80 steel with the addition of CS in saline medium (FIG. 6B) showed the homogeneous distribution of tip current throughout the scanning surface, and only a minor current peak was observed on the N80 surface during early exposure. During the entire exposure time, the SECM mapping results of inhibited N80 surface were relatively uniform and featureless. The attained SECM results displayed that the highest SECM tip current was detected to be about $5.94\times10^2$ nanoamperes (nA) in saline blank medium, and the lowest current of about 31.50 nA was observed for CS. The SECM tip current of the inhibited saline medium was far less in comparison with the blank saline, corroborating that the added CS inhibitor produces a thin adsorbed inhibitor film and protects the N80 surface against corrosion in saline solution.

Figure 7A:
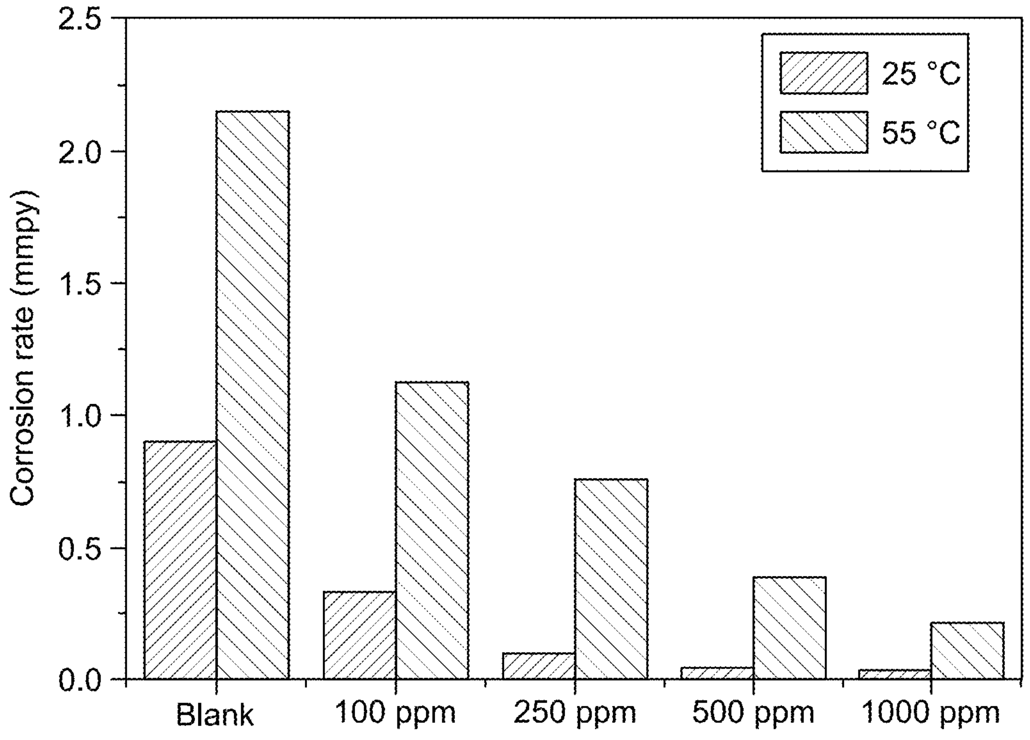
FIG. 7A depicts the effect of concentration of the CS on corrosion rate of the N80 steel at different temperatures, according to certain embodiments.

The weight loss method is an instinctive gravimetric approach that provides good consistency for distinguishing the inhibition characteristics of organic compounds as corrosion inhibitors. The weight loss experimentations were carried out at room temperature (RT) with and without the addition of CS in the saline medium at different concentrations for about 24 h. From the FIG. 7A, a reduction in corrosion rate was observed by adding the CS into the current investigated medium. Further, the inhibition efficiency also increased with increasing the concentration of CS, exhibiting the highest level of 85.55% and 92.57% at 500 and 1,000 ppm, respectively. From the weight loss test results, it can be understood that the increase of the adsorption extent of CS molecules on the N80 surface caused the inhibition occurrence of corrosion.

Figure 7B:
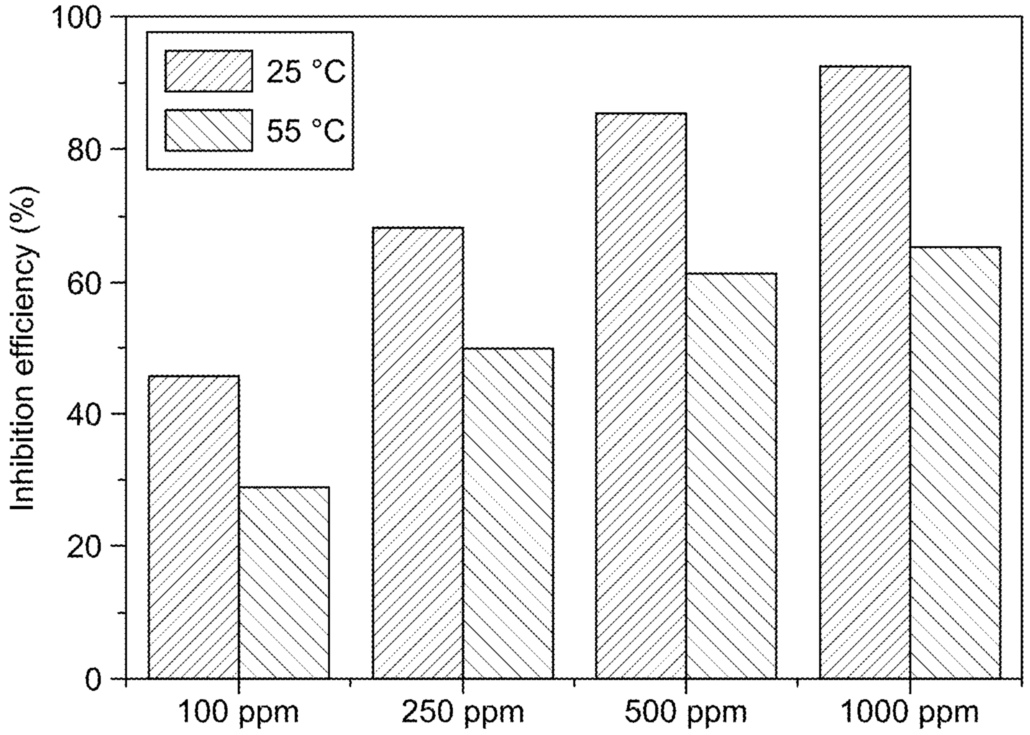
FIG. 7B depicts effect of concentration of the CS on the inhibition efficiencies of the N80 steel at different temperatures, according to certain embodiments.

The loss in weight of N80 steel at two different temperatures (25 and 55° C.) was recorded in the saline medium in the presence and absence of CS (1,000 ppm) (FIG. 7B). From the results obtained, the corrosion rate ($\eta$) as a variation of temperature in saline, the value of $\eta$ rises with increasing temperature with and without the addition of CS. The efficiency of the inhibitor (FIG. 7B) decreases at higher temperatures, which indicates that the CS is a temperature-related corrosion inhibitor. These results indicate that the CS promptly desorbs on the steel surface at higher temperatures. The recorded data from gravimetric tests were used to corroborate the adsorption kinetics of CS on the N80 surface. Using the relation between inhibition efficiency ($\eta$ %) and surface coverage ($\theta$), the degree of surface coverage ($\theta$) values was computed using the gravimetric result based on the equation, $\theta=\eta$ %/100. The values of correlation coefficient ($R^2$) were utilized to select the appropriate isotherm. Adsorption isotherm models, such as Temkin, Frumkin, Freundlich, and Langmuir isotherms, were instigated to use appropriate fitting using the obtained experimental data. However, the attained outcomes revealed that the Langmuir adsorption isotherm provided the exact accuracy on the adsorption behavior of the CS inhibitors on N80 substrates. Langmuir isotherm is designated using the following relation, $C/\theta=1/K_{ads}+C$, where C signifies the concentration of inhibitor, and $K_{ads}$ signifies the equilibrium constant adsorption-desorption phenomenon.

Gravimetric and electrochemical experimentations corroborated the effective inhibition action of CS on the N80 steel surface. Further, surface analysis is performed to describe the inhibition mechanism and the variation in their inhibition performance from the micro perspective. From the SEM image of corroded substrates in FIGS. 8A-8F, N80 steel experiences severe corrosion damages in the aggressive saline medium, showing plenty of porous corrosion products.

Figure 8A:
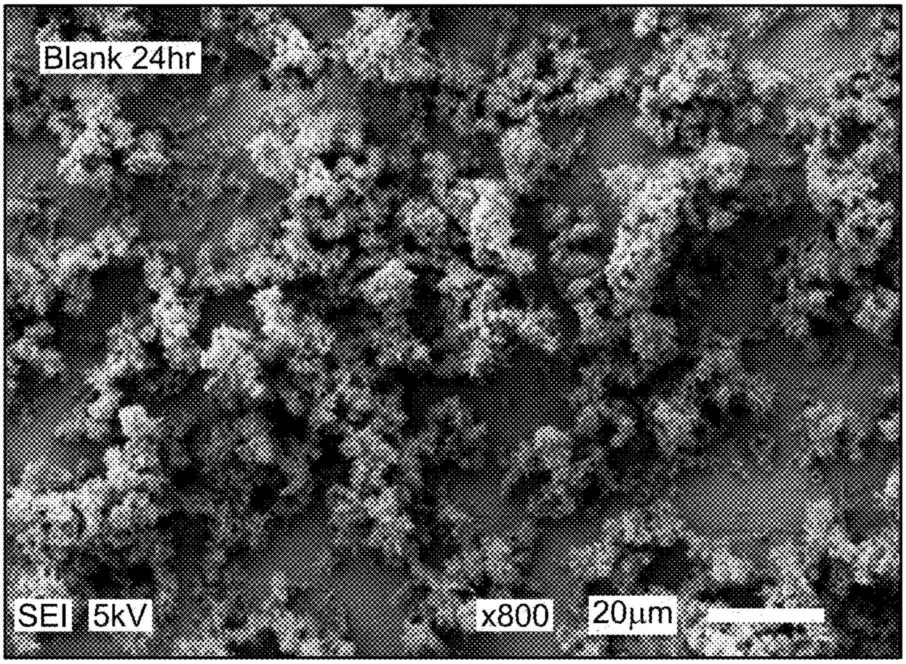
FIG. 8A depicts a scanning electron microscopy (SEM) image of the blank N80 steel surface showing severe corrosion damage after being exposed to a saline medium for 24 hours in the absence of the CS, according to certain embodiments.
Figure 8B:
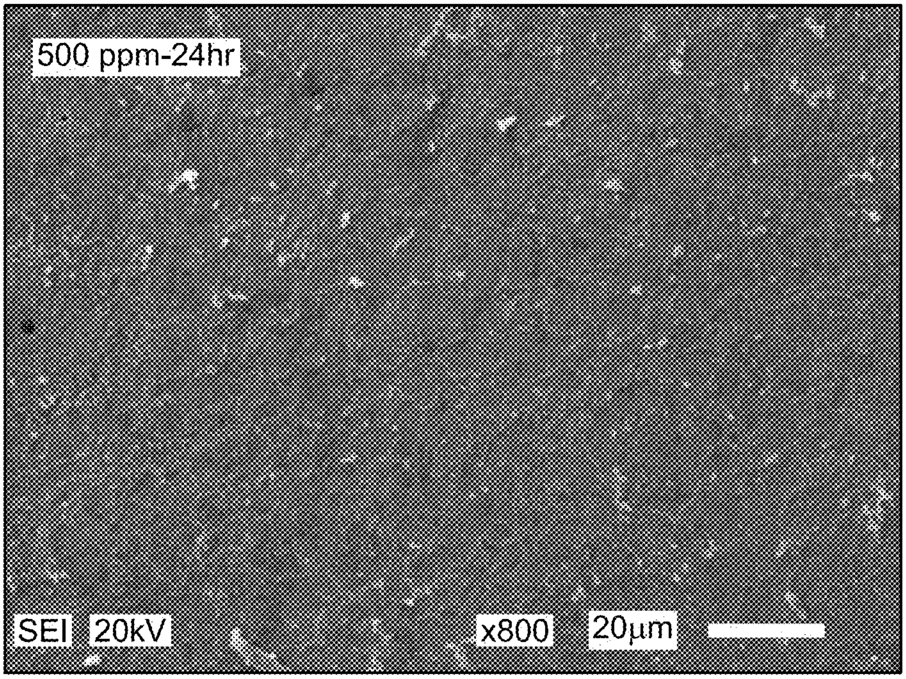
FIG. 8B depicts an SEM image of the N80 steel substrate after being exposed to a saline medium for 24 hours in the presence of the CS inhibitor at a concentration of 500 ppm, according to certain embodiments.
Figure 8C:
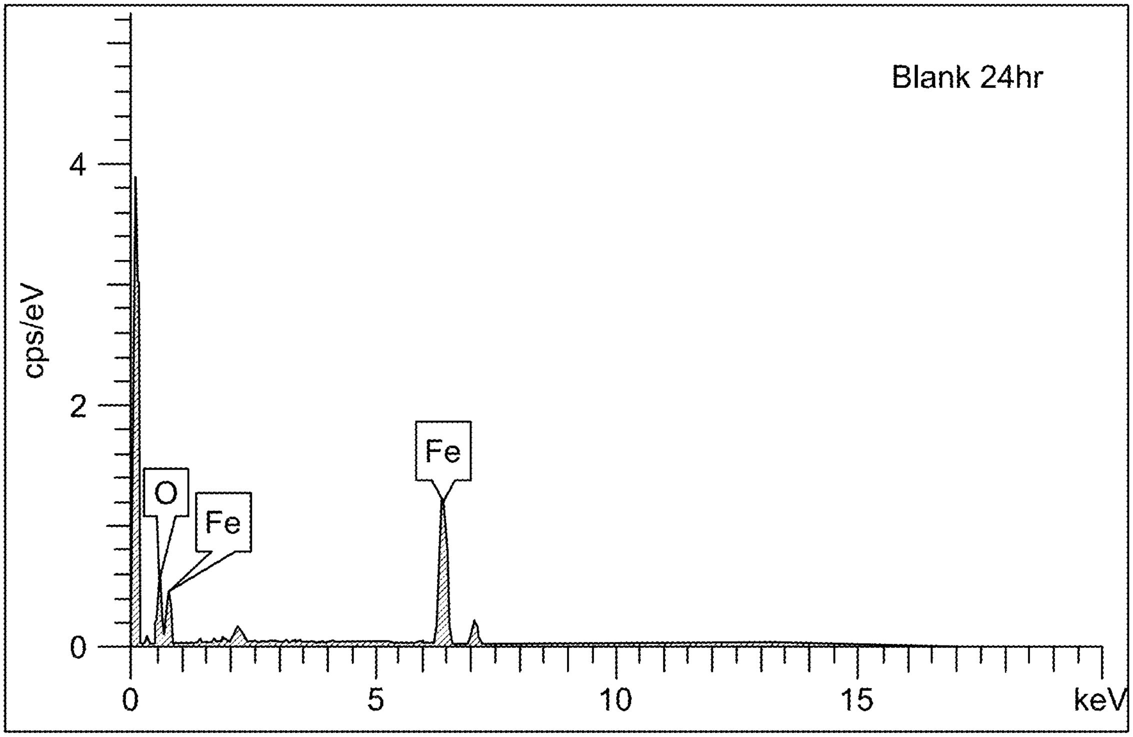
FIG. 8C depicts energy dispersive X-ray (EDS) analysis results of the blank N80 steel surface showing severe corrosion damage after being exposed to a saline medium for 24 hours in the absence of the CS, according to certain embodiments.
Figure 8D:
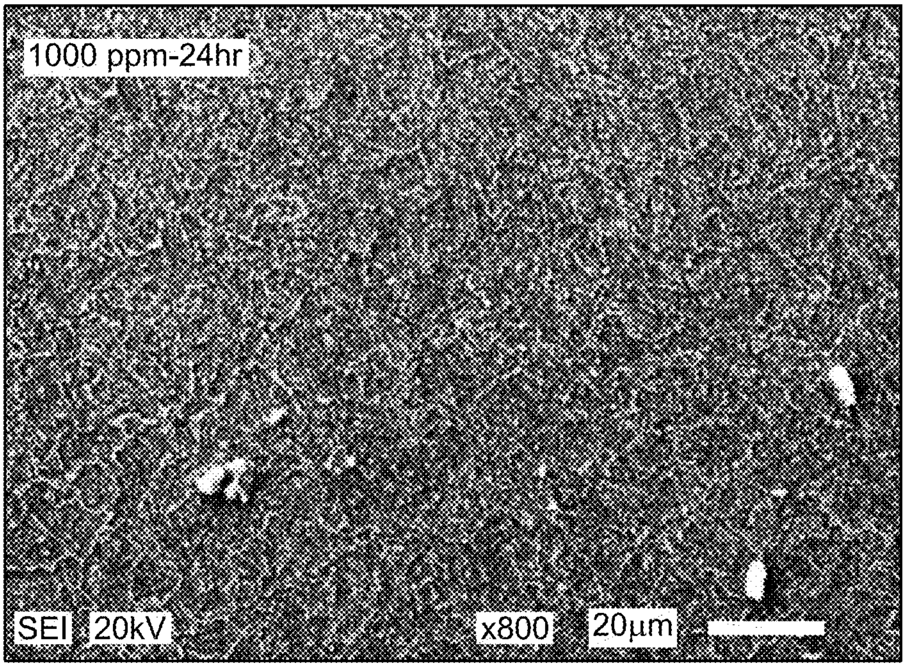
FIG. 8D depicts an SEM image of the N80 steel substrate after being exposed to a saline medium for 24 hours in the presence of the CS inhibitor at a concentration of 1,000 ppm, at 20 μm magnification, according to certain embodiments.
Figure 8E:
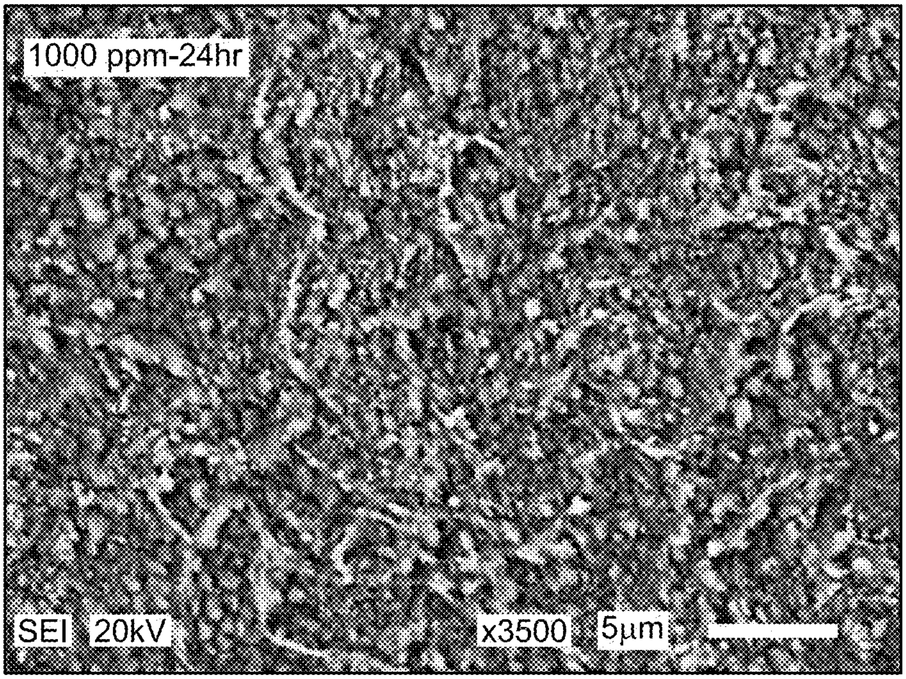
FIG. 8E depicts an SEM image of the N80 steel substrate after being exposed to saline medium for 24 hours in the presence of the CS inhibitor at a concentration of 1,000 ppm, at 5 μm magnification, according to certain embodiments.
Figure 8F:
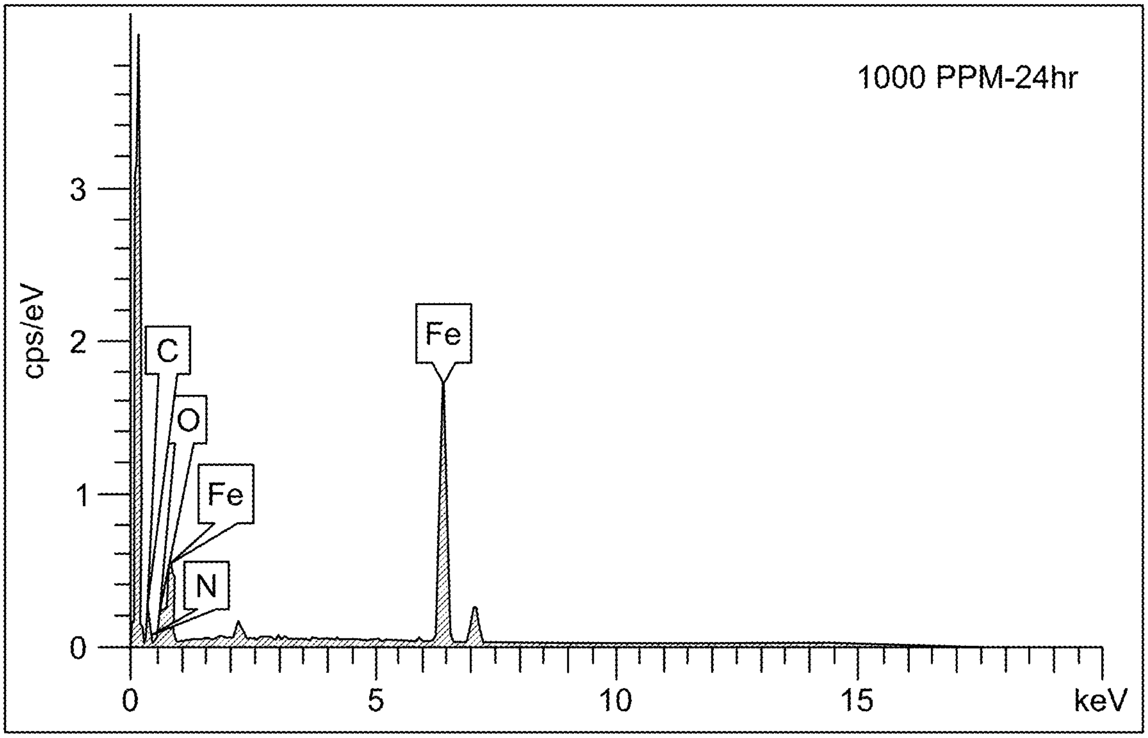
FIG. 8F depicts EDS analysis results of the N80 steel substrate after being exposed to saline medium for 24 hours in the presence of the CS inhibitor at a concentration of 1,000 ppm, according to certain embodiments.

When CS was introduced into the saline medium, the surface of the N80 substrates (FIGS. 8A-8F) became smooth with the obviously visible thin inhibitor film on their surface. The EDS analysis (FIGS. 8C and 8F) was performed to evaluate the elemental composition of the investigated N80 steel substrates. It is well known that EDS analysis is not an accurate method to estimate the weight percentages of elements, however, it can still be employed in verifying the existence of elements with low atomic numbers. In the blank saline (FIG. 8C), Fe, and O peaks were obtained, demonstrating the formation of corrosion products, such as iron oxides and hydroxides. However, after adding CS as a corrosion inhibitor, an N peak was detected in the resultant EDS spectra, which corroborated the adsorption of CS on the N80 surface (FIG. 8F).

Figure 9A:
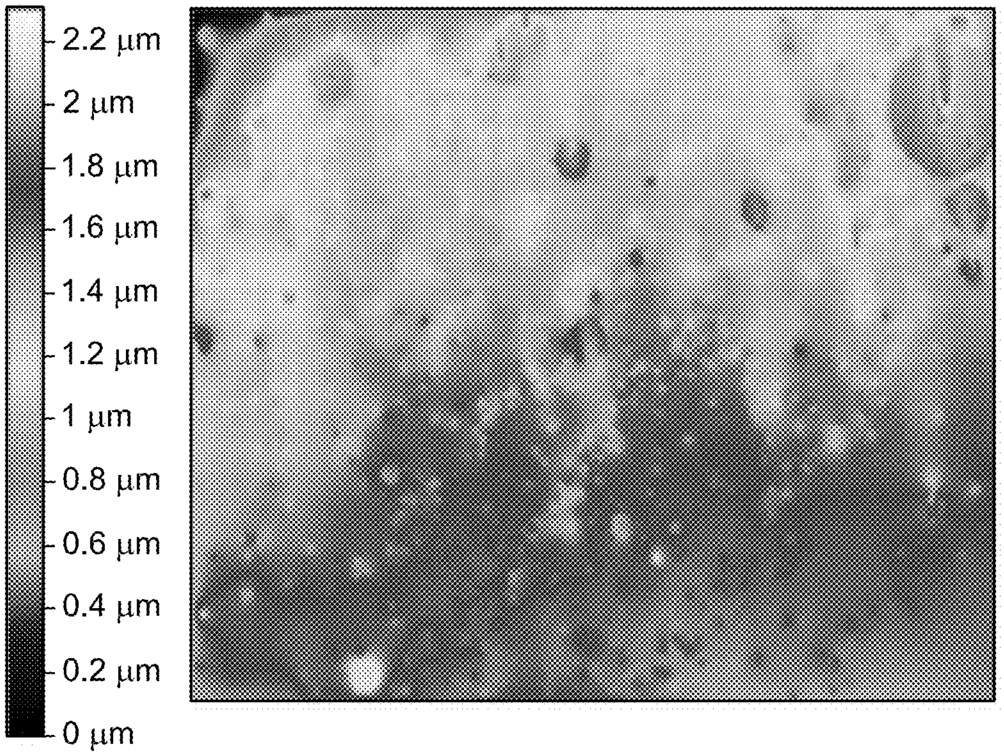
FIG. 9A depicts optical profilometric images of the blank N80 substrate in saline solution, according to certain embodiments.
Figure 9A:
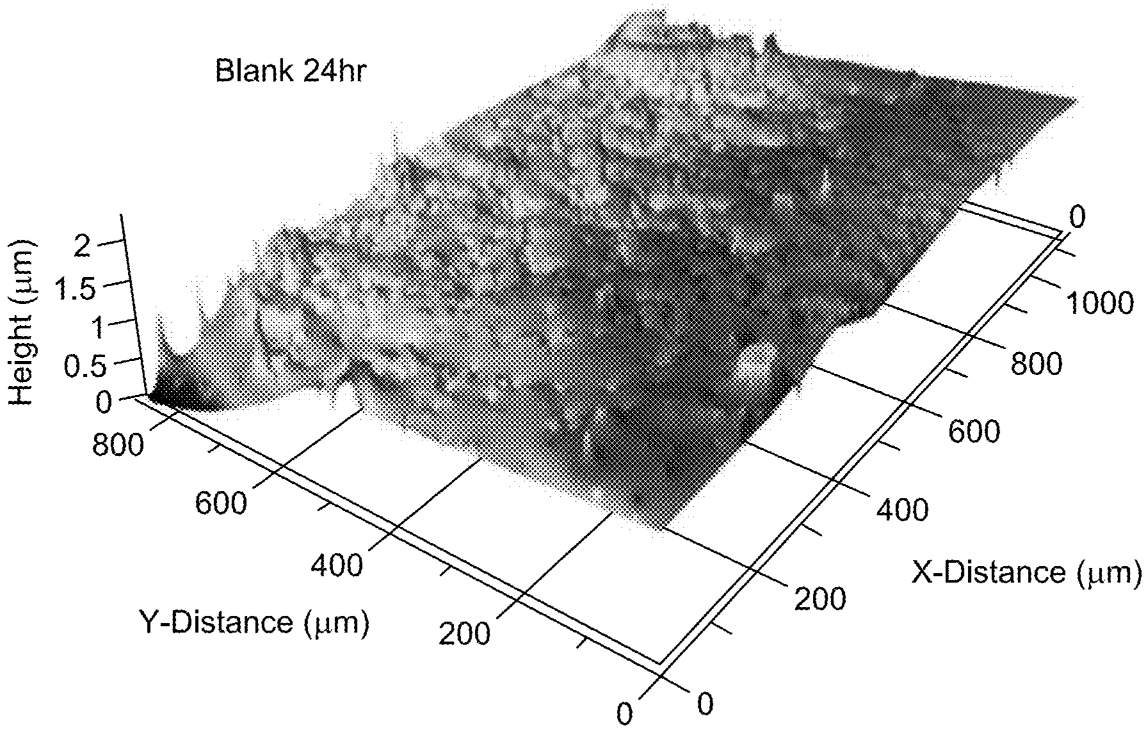
Figure 9A:
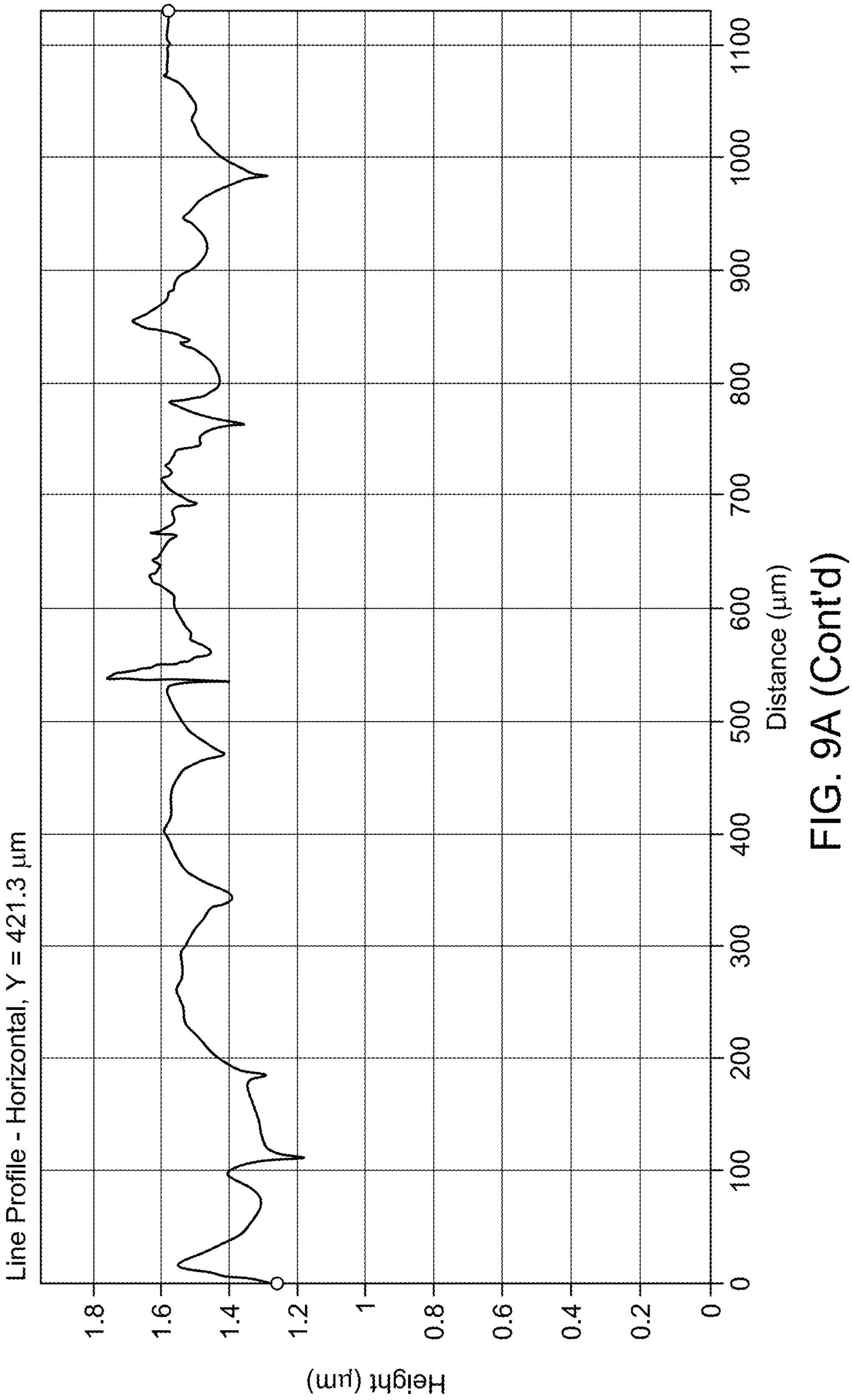
Figure 9B:
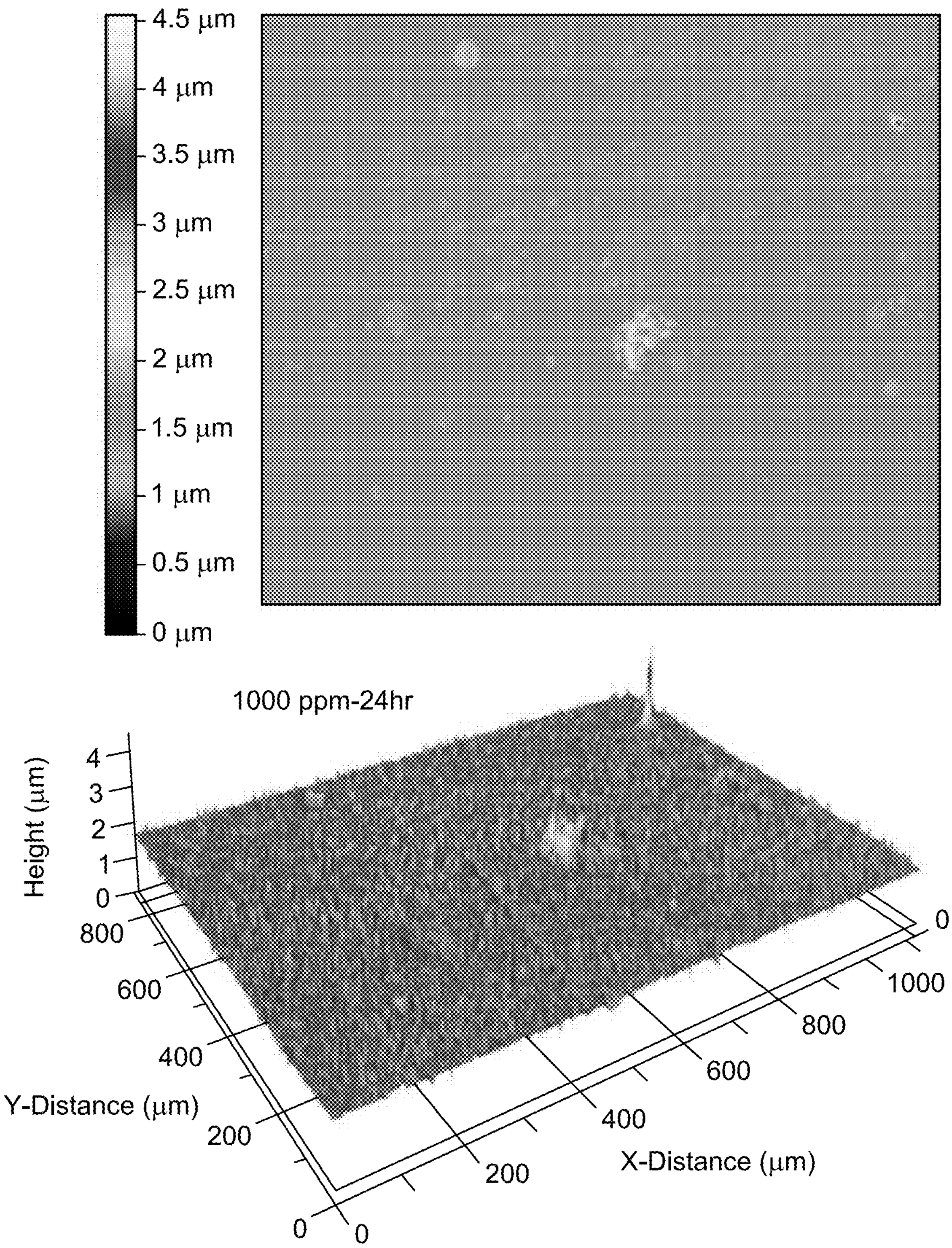
FIG. 9B depicts optical profilometric images of the N80 substrate in the presence of the CS inhibitor at a concentration of 1,000 ppm in saline, according to certain embodiments.
Figure 9B:
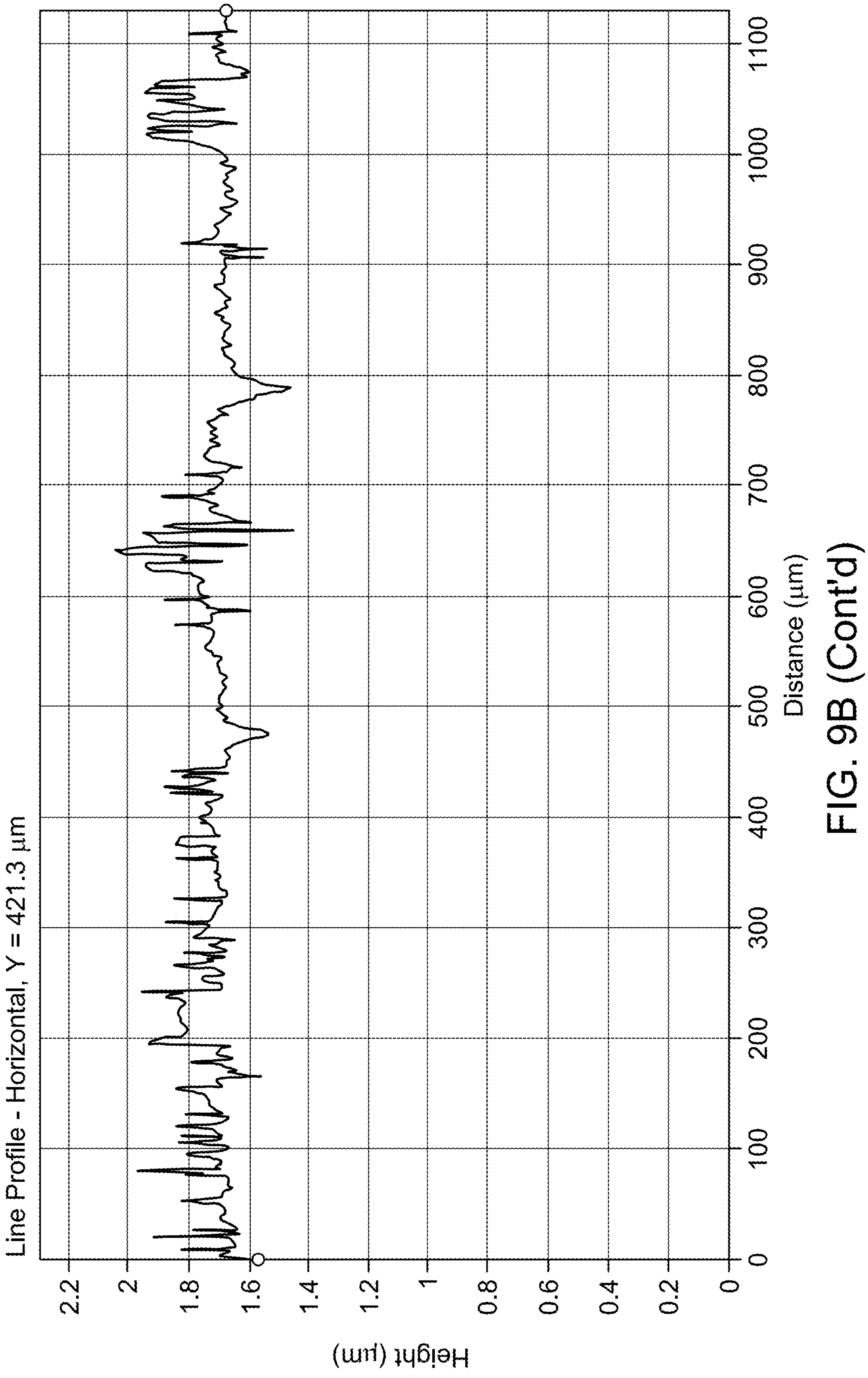

Surface topographical information on the N80 steel without and with CS in a saline medium was further analyzed through optical profilometric tests. The attained images are displayed in FIGS. 9A-9B to describe the corrosion extent of the N80 surface with roughness. Because of the severe corrosion damage in the blank saline solution producing the porous corrosion film, the surface topographies of the N80 surface in FIG. 9A displays a high arithmetic mean (RA).

By introducing CS at a concentration of 1,000 ppm, the surface roughness of N80 steel considerably decreased. In the same way, other surface roughness parameters were accordingly decreased. By monitoring the values of RA, which are the broadly employed parameters for evaluating the surface roughness, the CS can be highly protective and reveal higher inhibitive characteristics on N80 steel in the saline medium.

Figure 10:
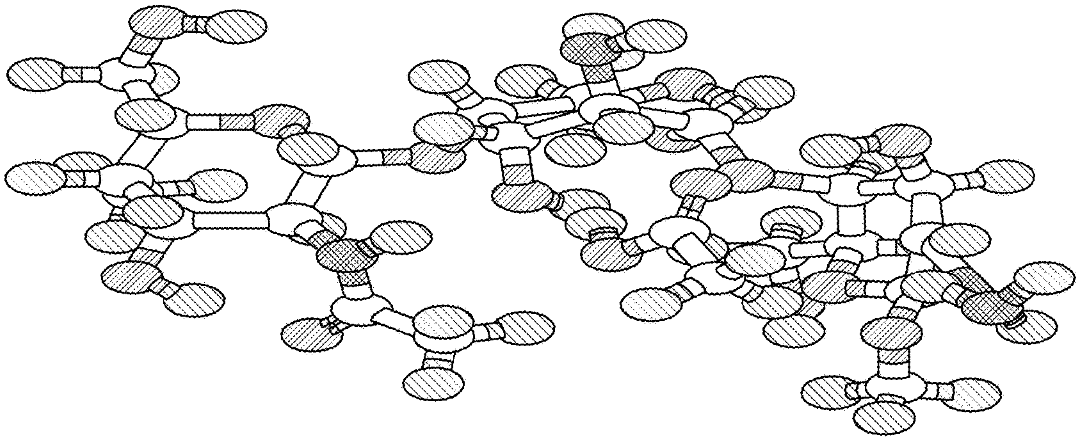
FIG. 10 depicts optimized geometry, highest occupied molecular orbital (HOMO), and lowest unoccupied molecular orbital (LUMO) of the CS in the aqueous phase, according to certain embodiments.
Figure 10:
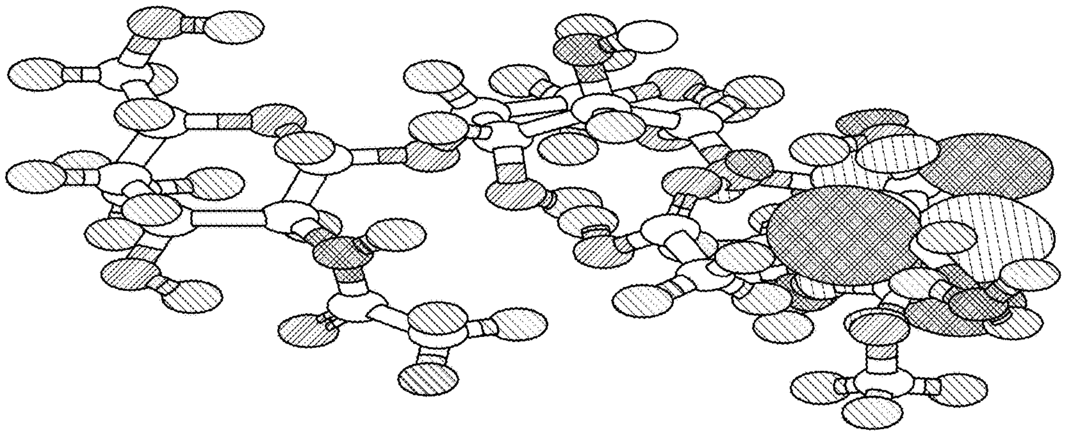
Figure 10:
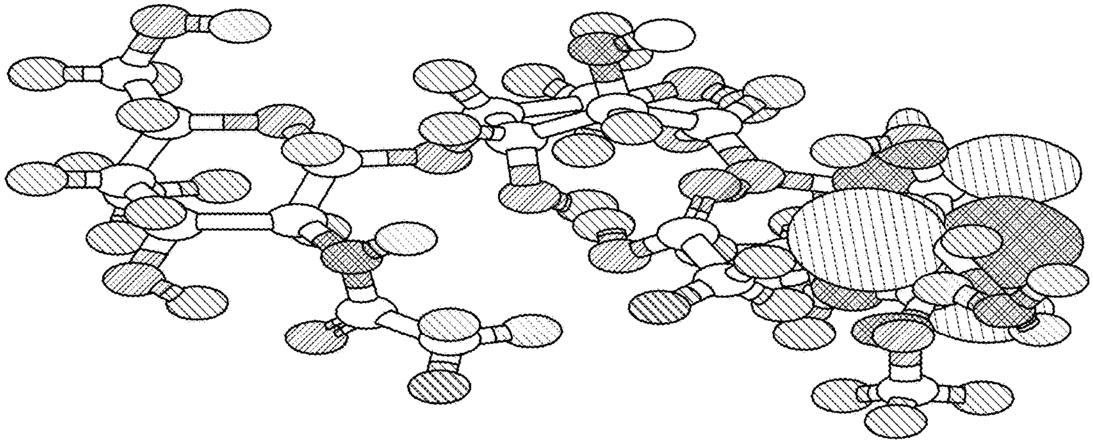

DFT calculations gain useful insight into the reactivity sites of CS used in inhibition of corrosion of steel in HCl solution. The GGA-BYLP level of theory was used to compute the highest occupied molecular orbitals (HOMO) and lowest unoccupied molecular orbitals (LUMO) of CS. HOMO is the electron donor site of CS, whereas LUMO is the electron acceptor site for interaction with Fe (steel). A single monomeric unit of CS was utilized to reduce the computational cost. From FIG. 10, the distribution of HOMO and LUMO orbitals are mainly localized on the ring of CS containing the $NH_3^+$—$CH_3COO^-$ salt group. These are the main reactive sites used by CS to inhibit steel corrosion.

Figure 11A:
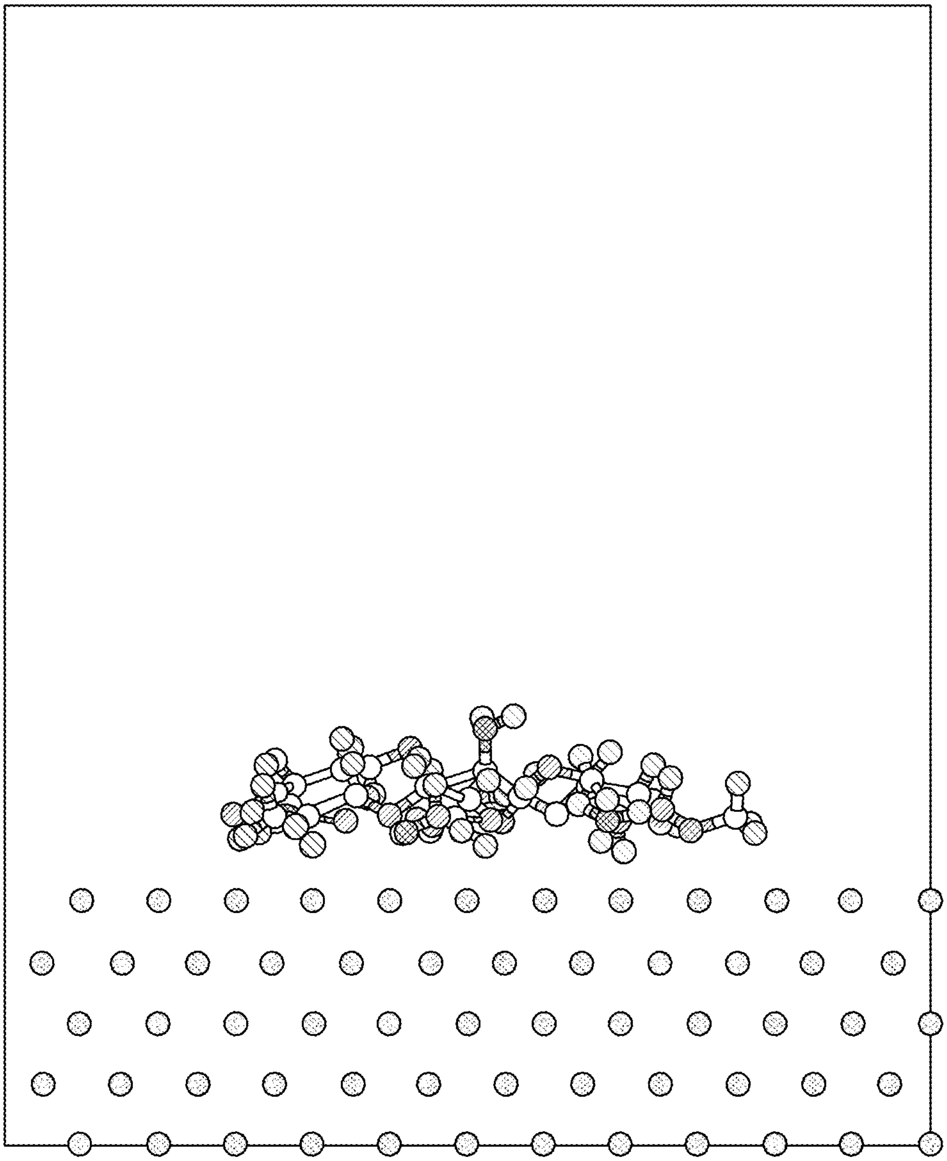
FIG. 11A depicts a side view of the stable adsorption configuration of the CS on the Fe (1 1 0) surface in an aqueous solution at 298 kelvin (K) obtained from Monte Carlo simulations, according to certain embodiments.
Figure 11B:
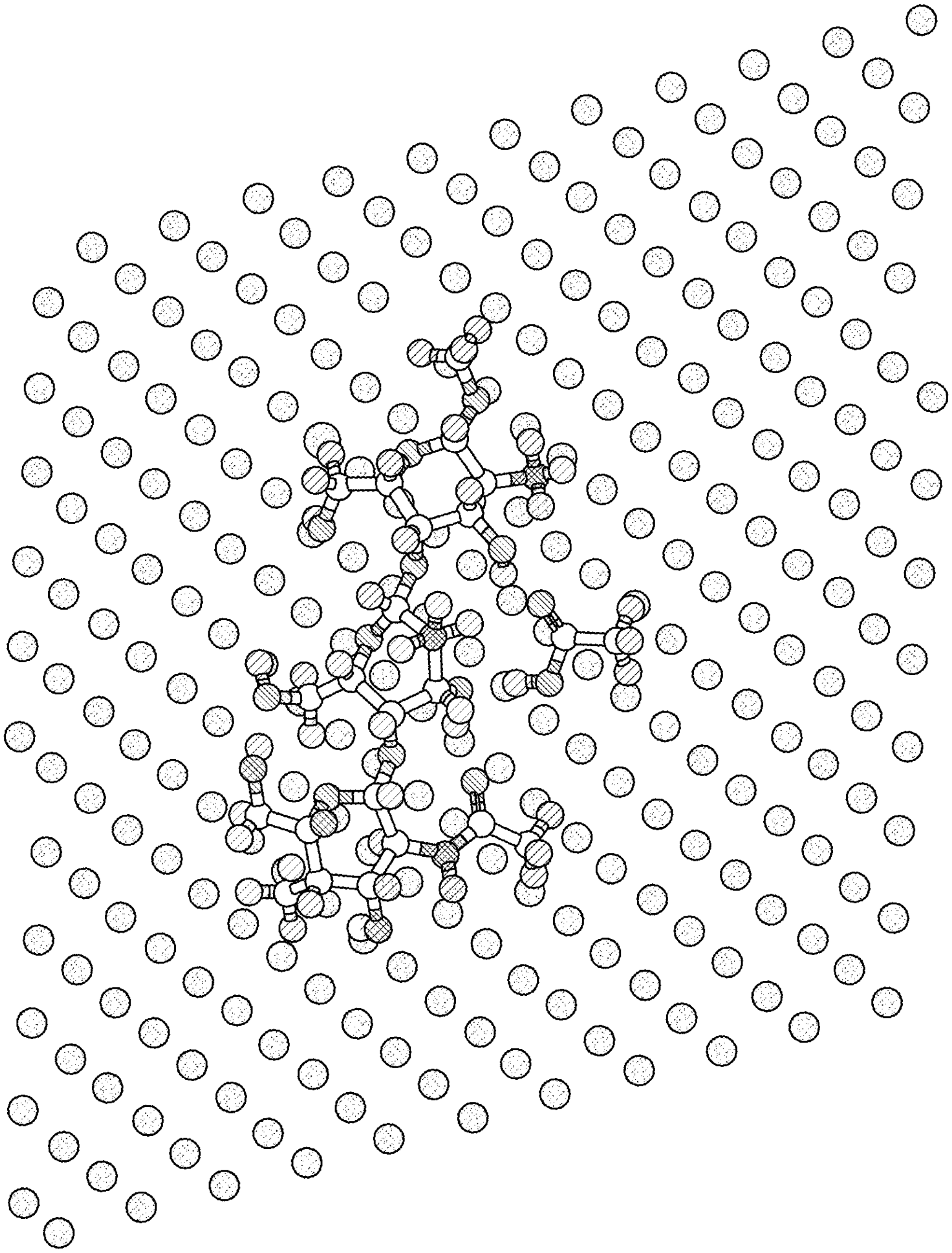
FIG. 11B depicts a top view of the stable adsorption configuration of the CS on the Fe (1 1 0) surface in an aqueous solution at 298 kelvin (K) obtained from Monte Carlo simulations, according to certain embodiments.

FIGS. 11A-11B show the top and side views of the stable adsorption configuration of CS on Fe (1 1 0) surface in aqueous solution at 298 K obtained from Monte Carlo simulations. It is evident that CS gave a parallel adsorption configuration on the Fe (110) surface using the N, O, and other heteroatoms on the CS ring. This adsorption maximizes the contact between CS and Fe surface leading to corrosion inhibition. Furthermore, the average adsorption energy obtained for the interaction of CS with Fe (110) surface was-358.6 kilocalories per mole (kcal/mol), which is one order of magnitude larger than that of water (average −10.1 kcal/mol). This is an indication that CS can displace water molecules from the Fe (steel) surface, thereby ensuring strong adsorption on the steel surface and inhibiting corrosion reaction. The adsorption energy of CS is high and negative, indicating a stable adsorption. The Monte Carlo simulation results obtained corroborate the high inhibition efficiency obtained experimentally for CS.

Numerous modifications and variations of the present disclosure are possible in light of the above teachings. It is therefore to be understood that within the scope of the appended claims, the invention may be practiced otherwise than as specifically described herein.

The invention claimed is:

1. A method of inhibiting corrosion of a metal surface, comprising:

contacting the metal surface with a chitosan salt in the presence of a corrosive medium, wherein the corrosive medium is saltwater, wherein on the contacting at least a portion of the chitosan salt adsorbs to the metal surface, wherein at least one unit in the chitosan salt has the following formula (I), (I)

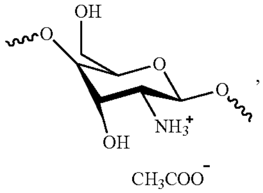

, wherein the indicate bonding to additional units of the chitosan salt, wherein the chitosan salt has a higher solubility in water than a same chitosan that is not in a salt form, and wherein the metal surface in the corrosive medium has a corrosion inhibition efficiency at least 80% higher than a same metal surface in the corrosive medium that is not contacted with the chitosan salt.

2. The method of claim 1, wherein at least 50% of the units in the chitosan salt are deacetylated.

3. The method of claim 1, wherein 75-85% of the units in the chitosan salt are deacetylated.

4. The method of claim 1, wherein at least 10% of the units in the chitosan salt have the formula (I).

5. The method of claim 1, wherein the chitosan salt has a molecular weight of 190,000-310,000 Da.

6. The method of claim 1, wherein the chitosan salt further comprises units having the following formulas (II) and (III), (II)

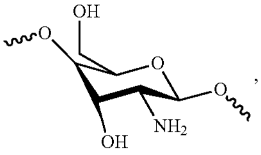

, (III)

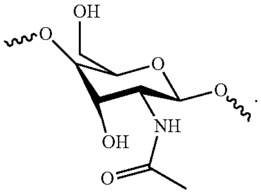

.

7. The method of claim 6, wherein the chitosan salt does not comprise units having a formula other than formulas (I), (II), and (III).

8. The method of claim 1, wherein the chitosan salt does not comprise a phosphate group, a carboxyl group, or a Schiff base group, chemically bonded to a unit of the chitosan salt.

9. The method of claim 1, wherein the chitosan salt has a substantially same morphology and stability as the chitosan that is not in the salt form.

10. The method of claim 1, wherein the chitosan salt is both amorphous and crystalline.

11. The method of claim 1, wherein the saltwater comprises 1,000-100,000 parts per million (ppm) (weight by volume (w/v)) of a salt.

12. The method of claim 1, wherein the saltwater has a temperature of 20-80° C.

13. The method of claim 1, wherein the metal surface is made of at least one metal selected from the group consisting of a carbon steel, a carbon steel alloy, and a mild steel.

14. The method of claim 1, wherein the metal surface is part of a casing, a pipe, a pump, a screen, a valve, or a fitting of an oil or gas well.

15. The method of claim 1, wherein the chitosan salt has a concentration of 1-1,000 ppm (w/v) in the corrosive medium.

16. The method of claim 1, wherein the chitosan salt has a concentration of 1,000 ppm (w/v) in the corrosive medium, and wherein the metal surface in the corrosive medium has a corrosion inhibition efficiency 96% higher than the same metal surface in the corrosive medium that is not contacted with the chitosan salt.

17. The method of claim 1, wherein the metal surface has a corrosion rate of less than 0.5 millimeter per year (mmpy) in the corrosive medium.

18. The method of claim 1, wherein the chitosan salt has a concentration of 250-1,000 ppm (w/v) in the corrosive medium, and wherein the metal surface has a corrosion rate of less than 0.05 mmpy in the corrosive medium.

* * * * *